(12) United States Patent
Katakai

(10) Patent No.: US 7,542,093 B2
(45) Date of Patent: Jun. 2, 2009

(54) ELECTRONIC APPARATUS, CONNECTING MOUNTING FOR ELECTRONIC APPARATUS, AND CONNECTING SYSTEM INCLUDING ELECTRONIC APPARATUS AND CONNECTING MOUNTING

(75) Inventor: Satoshi Katakai, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 495 days.

(21) Appl. No.: 10/502,496

(22) PCT Filed: Nov. 27, 2003

(86) PCT No.: PCT/JP03/15188

§ 371 (c)(1),
(2), (4) Date: Jul. 22, 2004

(87) PCT Pub. No.: WO2004/049693

PCT Pub. Date: Jun. 10, 2004

(65) Prior Publication Data
US 2005/0225666 A1  Oct. 13, 2005

(30) Foreign Application Priority Data
Nov. 27, 2002 (JP) .............................. 2002-343191
Sep. 30, 2003 (JP) .............................. 2003-339355

(51) Int. Cl.
*H04N 5/225* (2006.01)
(52) U.S. Cl. .................... 348/373; 348/207.1; 348/375
(58) Field of Classification Search ............. 348/207.1, 348/373, 375; 358/302
See application file for complete search history.

(56) References Cited

U.S. PATENT DOCUMENTS

| 4,626,053 | A | 12/1986 | Fayfield |
| 2002/0071035 | A1 | 6/2002 | Sobol |
| 2002/0093583 | A1 | 7/2002 | Ito |
| 2002/0149695 | A1 | 10/2002 | Kayanuma |
| 2003/0117521 | A1* | 6/2003 | Nagaoka .................... 348/373 |

FOREIGN PATENT DOCUMENTS

| JP | 2002-218300 A | 8/2002 |
| JP | 2003-87621 | 3/2003 |
| JP | 2003-198910 A | 7/2003 |

OTHER PUBLICATIONS

Sony DSC-F77 Digital Camera, publication date Feb. 9, 2002 (p. 2).*

* cited by examiner

*Primary Examiner*—James M Hannett
(74) *Attorney, Agent, or Firm*—Frishauf, Holtz, Goodman & Chick, P.C.

(57) ABSTRACT connecting system includes a cradle (1) and a digital camera (10) electrically connected to the cradle (1) through connectors (5, 15). The cradle (1) hold the digital camera (10) with a liquid crystal display (13) facing the front and also with the photographing lens (12) facing the front. The cradle (1) electrically detects whether the digital camera (10) is held with the display (13) facing the front or with the photographing lens facing the front. When the digital camera (10) is held with the display facing the front, operation starts in a recorded image-data transferring mode. When the digital camera (10) is held with the photographing lens facing the front, operation starts in a PC camera mode. A desired operation mode can be set in the digital camera simply by changing the installing state of the digital camera (10).

22 Claims, 15 Drawing Sheets

ELECTRONIC APPARATUS, CONNECTING MOUNTING FOR ELECTRONIC APPARATUS, AND CONNECTING SYSTEM INCLUDING ELECTRONIC APPARATUS AND CONNECTING MOUNTING

TECHNICAL FIELD

The present invention relates to a connecting system including a connecting mounting and a portable electronic apparatus detachably installed onto the connecting mounting, and a connecting system including an electronic apparatus, a connecting mounting, a portable electronic apparatus and a data processing apparatus for exchanging data with the portable electronic apparatus through the connecting mounting, and further relates to a data processing apparatus and an operation mode setting method.

BACKGROUND ART

In general, together with a portable electronic apparatus such as a Personal Digital Assistant (PDA), an electronic notebook, digital camera, etc., a connecting mounting so called a cradle is used to charge its built-in rechargeable battery and/or to exchange data with an external personal computer (PC). The conventional cradle has a holding body for holding the electronic apparatus and further has a connector on its holding body to be connected with a connector of the electronic apparatus. The rechargeable battery of the electronic apparatus is charged while the electronic apparatus is held by the cradle. The cradle, which is used for exchanging data between the electronic apparatus and an external apparatus such as the personal computer (PC), has a USB or RS-232C connector on its holding body in addition to the connector set forth above, to be connected with the personal computer though a connecting cable.

In the well known connecting system including the cradle and the electronic apparatus, when a digital camera having plural operation modes for exchanging data with the personal computer is turned on with the same installed on the cradle, a previously set communication mode rises up automatically to start the operation. For instance, such connecting system is disclosed in Japanese laid-open patent application No. 2002-218300 (Page 8, FIG. 9).

However, in the connecting system including the cradle and the electronic apparatus as set forth above, when a user wants to transfer data from the digital camera to the personal computer, he or she is required to previously set the digital camera in his/her desired communication mode. Further, since the conventional digital camera has various parameters and setting items to be set by the user, the user is required to do troublesome manipulations to select his/her desired mode from among plural communication modes included in the communication mode, after the communication mode has been set.

Therefore, even though the user can start up the communication mode simply by turning the power on with the digital camera installed onto the cradle, the user is still required to do troublesome preparation operation before he/she uses his/her desired communication function.

The present invention has been made to solve the problems set forth above. It is an object of the present invention to provide a connecting system, an electronic apparatus, and a mode setting method for improving operability in using a certain function when the electronic apparatus is mounted on the connecting mounting, and a connecting system, an electronic apparatus, a connecting mounting, a data processing apparatus and an operation mode setting method for improving operability in using data created by the electronic apparatus.

DISCLOSURE OF INVENTION

According to a first aspect of the present invention, a connecting system has a connecting mounting, an electronic apparatus detachably mountable on the connecting mounting so as to be electrically connected to the connecting mounting, and a data processing apparatus which exchanges data with the electronic apparatus through the connecting mounting. The connecting system comprises a holding unit which is mounted on the connecting mounting, and on which the electronic apparatus is mountable with a part of the electronic apparatus facing various directions, a judging unit which is included in the data processing apparatus, and which judges a direction relative to the connecting mounting that the part of the electronic apparatus faces when the electronic apparatus is mounted on the holding unit, and a mode setting unit which is included in the data processing apparatus, and which sets the electronic apparatus, in accordance with the direction of the part of the electronic apparatus judged by the judging unit, in an operation mode in which data is exchanged between the electronic apparatus and the data processing apparatus.

According to a second aspect of the present invention, a data processing apparatus exchanges data with an electronic apparatus through a connecting mounting when the electronic apparatus is electrically connected to the connecting mounting. The data processing apparatus comprises a judging unit which judges a direction relative to the connecting mounting that a part of the electronic apparatus faces when the electronic apparatus is mounted on the connecting mounting, and a mode setting unit which sets the data processing apparatus, in accordance with the direction judged by the judging unit, in an operation mode in which data is exchanged between the data processing apparatus and the electronic apparatus.

According to a third aspect of the present invention, there is provided a operation mode setting method for a data processing apparatus which exchanges data with an electronic apparatus through a connecting mounting when the electronic apparatus is detachably mounted on the connecting mounting and is electrically connected to the connecting mounting. The operation mode setting method comprises judging a direction relative to the connecting mounting that a part of the electronic apparatus faces when the electronic apparatus is mounted on the connecting mounting, and setting the data processing apparatus, in accordance with the judged direction, in an operation mode in which data is exchanged between the data processing apparatus and the electronic apparatus.

According to a fourth aspect of the present invention, a computer readable recording medium having a computer readable program stored thereon is provided for a connecting system having a connecting mounting, an electronic apparatus detachably mountable on the connecting mounting so as to be electrically connected to the connecting mounting, a holding unit which is mounted on the connecting mounting and on which the electronic apparatus is mountable with a part of the electronic apparatus facing various directions, and a data processing apparatus which exchanges data with the electronic apparatus through the connecting mounting. The computer readable program causes the connecting system to perform functions which comprise judging a direction relative to the connecting mounting that the part of the electronic apparatus faces when the electronic apparatus is mounted on the holding unit, and setting the electronic apparatus, in accordance with the judged direction of the part of the electronic apparatus, in an operation mode in which data is exchanged between the electronic apparatus and the data processing apparatus.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

BEST MODE FOR CARRYING OUT THE INVENTION

Embodiments of the present invention will be described with reference to the accompanying drawings.

First Embodiment

Figure 1:
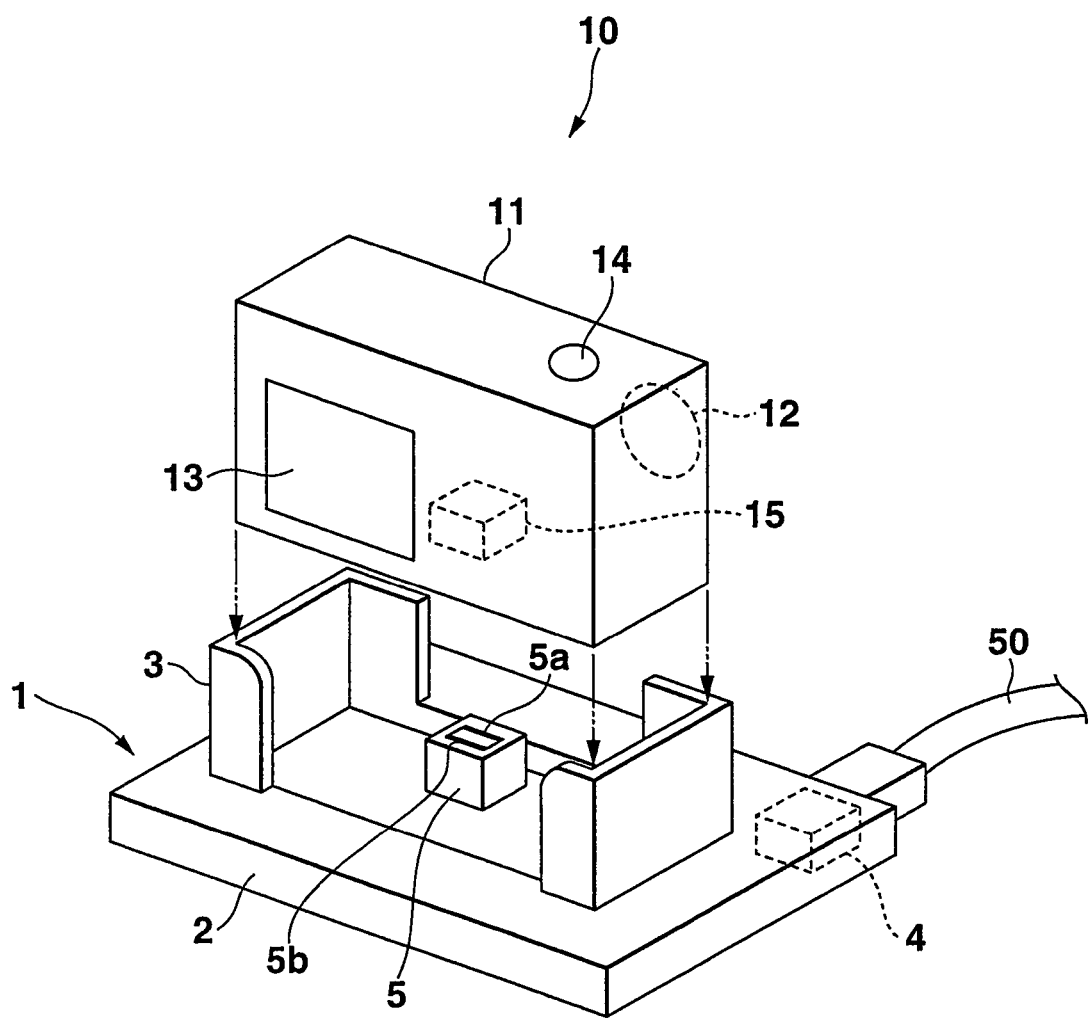
FIG. 1 is an external perspective view of a connecting system according to a first embodiment of the invention.

FIG. 1 is a view illustrating a perspective external view of a connecting system according to a first embodiment of the invention. The connecting system includes a connecting mounting or a cradle 1 and a digital camera 10 which is mounted on the cradle 1. When mounted on or held by the cradle 1, the digital camera 10 is electrically connected to a personal computer (PC) through the cradle 1 to exchange data therewith.

The cradle 1 has a base 2 and a holding unit 3 mounted on the base 2. The holding unit 3 of the cradle 1 has a structure for slightly tilting the digital camera 10 back to hold therein. The base 2 of the cradle 1 has a first connector 4 in its rear side and a second connector 5 on its top surface, which projects from the top surface and surrounded by the holding unit 3. A cable 50 connected with the personal computer at its one end (not shown) is connected to the first connector 4 of the cradle 1. Terminals of the first connector 4 are connected to those of the second connector 5 in the base 2, respectively.

The digital camera 10 has a body 11, which has a photographing lens 12 on its front face, a liquid crystal display 13 on its read face and a shutter button 14 on its top surface. The body 12 of the digital camera 10 has a connector 15 on its bottom surface, which is to be connected with the second connector 5 of the cradle 1 when the digital camera is mounted on the cradle 1. In the description hereafter, the second connector 5 and the connector 15 are referred to as a "cradle connector" and a "camera connector," respectively.

In the present embodiment, the cradle connector 5 is a male connector and the camera connector 15 is a female connector. When the digital camera 10 is mounted on the cradle 1, the cradle connector 5 and the camera connector 15 are electrically connected with each other. The cradle connector 5 and the camera connector 15 are configured such that both connectors can be connected with each other when the digital camera 10 is held in the cradle 1 with the liquid crystal display 13 facing the front (in the first state) as shown in FIG. 1 and also both connectors can be connected with each other even when the digital camera 10 is held in the cradle 1 with the photographing lens 12 facing the front (in the second state) (not shown).

More specifically, the cradle connector 5 is located in the center of the holding unit 3 and the camera connector 15 is located in the center of the bottom of the camera body 11. Further, the cradle connector 5 consists of two terminal arrays 5a, 5b, which are disposed in parallel at a front side and a rear side of the base 2 respectively, each including a set of plural connecting terminals arranged in a line. The plural connecting terminals in one of the two sets are arranged in reverse order from the other set and the two sets of the plural connecting terminals are connected to the corresponding connecting terminals of the first connector 4, respectively. Meanwhile, the camera connector 15 has plural connecting terminals which are to be connected with those of either of the terminal arrays 5a, 5b of the cradle connector 5 (not shown).

As described above, the cradle connector 5 and the camera connector 15 can be electrically connected with each other whether the digital camera 10 is set in the first state or in the second state. Further, the cradle connector 5 and the camera connector 15 include detection terminals respectively, each for electrically detecting to which terminal arrays 5a, 5b of the cradle connector 5 the camera connector 15 is connected.

Figure 2:
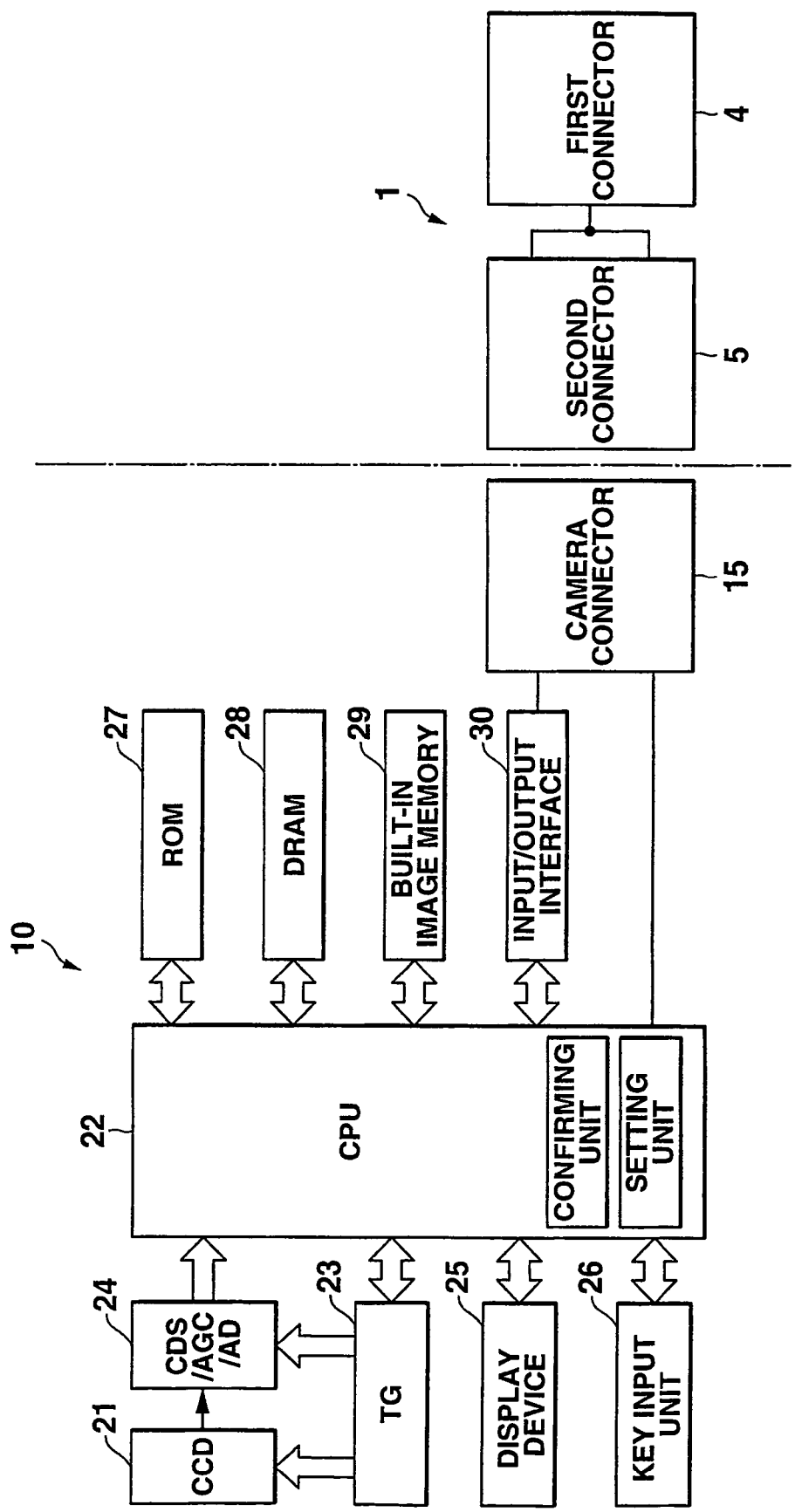
FIG. 2 is a block diagram illustrating circuit configurations of a digital camera and a cradle of the first embodiment.

FIG. 2 is a block diagram illustrating circuit configurations of the digital camera 10 and the cradle 1. The digital camera 10 has a solid-state image-pickup element or CCD 21 and CPU 22. CPU 22 transfers an optical image of a subject produced by a focus lens and a zoom lens (not shown) into an analog image-pickup signal corresponding to the optical image of the subject. CPU 22 has functions of various digital signal processes including image-data compression and expansion using JPEG format, and serves to control the whole operation of the digital camera 10.

CPU 22 is connected with a timing signal generator (TG) 23 for driving CCD 21. TG 23 is connected with a unit circuit 24 to which the image-pickup signal is supplied from CCD 21. The unit circuit 24 includes CDS circuit for correlated-double sampling the image-pickup signal supplied from CCD 21, an automatic gain control amplifier (AGC) for amplifying the sampled image-pickup signal, and an analog digital converter (AD) for converting the analog image-pickup signal into a digital signal. As described above, the image-pickup signal generated by CCD 21 is converted into the digital signal in the unit circuit 24, and the digital signal is further sent to CPU 22.

Further, CPU 22 is connected with a display device 25, a key input unit 26, ROM 27, DRAM 28, a built-in image memory 29, and an input/output interface 30. DRAM 28 is used as a buffer memory for temporarily storing the digital image data supplied from CCD 21 through the unit circuit 24 and also serves as a working memory for CPU 22. The image data temporarily stored in DRAM 28 is compressed and is finally stored in the built-in image memory 29. The display device 25 includes the liquid crystal display 13 and a driving circuit, and displays a through image of a subject image generated by CCD 21 in a photograph-standby mode and displays image data stored in the built-in image memory 29 in a reproducing mode. The key input unit 26 includes the shutter button 14, plural operation keys such as a power key and a mode selection key (not shown), and outputs to CPU 22 a key input signal corresponding to a key operation by a user.

The input/output interface 30 is connected to the camera connector 15, and through which interface 30 (USB interface or RS-232C interface) data is exchanged under control of CPU 22 between the digital camera 10 and the personal computer connected to the digital camera 10 through the cradle 1.

In ROM 27 are stored a control program which is executed by CPU 22 to control the whole operation of the digital camera 10 and various data which are required for operation of CPU 22. CPU 22 executes the control program to function as a confirming unit and a setting unit.

Figure 3:
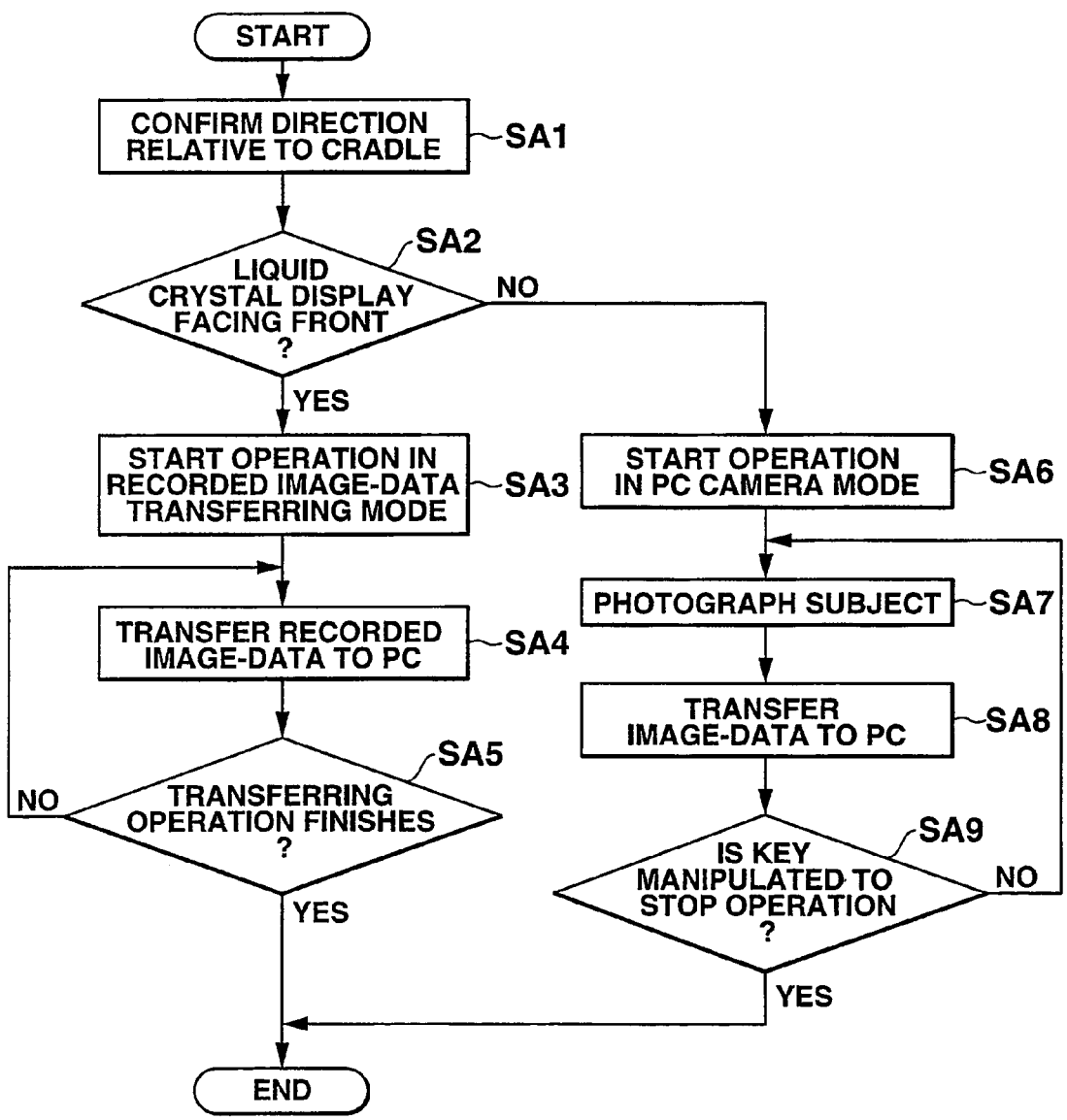
FIG. 3 is a flow chart showing processes performed by the digital camera when the digital camera is mounted on the cradle.

FIG. 3 is a flow chart showing processes performed in the digital camera 10, the power of which has been turned on and which is mounted on the cradle 1 connected to the personal computer through the communication cable 50.

When the digital camera 10 is mounted on the cradle 1, CPU 22 judges to which terminal arrays 5a, 5b of the cradle connector 5 the camera connector 15 is connected, and confirms at Step SA1 whether the digital camera 10 is mounted on the cradle 1 in the first state or in the second state.

When it is confirmed at Step SA2 that the digital camera 10 is mounted on the cradle 1 in the first state or that the digital camera 10 is mounted on the cradle 1 with the liquid crystal display 13 facing the front as shown in FIG. 1, CPU 22 sets the operation mode to a recorded image-data transferring mode and starts its operation in the recorded image-data transferring mode at Step SA3. CPU 22 reads out image data (image files) from the built-in image memory 29 in a predetermined order and transfers the read out image data to the personal computer at Step SA4. CPU 22 continues reading out and transferring the image data to the personal computer until all the image data have been transferred to the personal computer, and finishes the operation in the recorded image-data transferring mode when all the image data have been transferred to the personal computer (Step SA5: YES).

Meanwhile, when it is confirmed that the digital camera 10 is mounted on the cradle 1 with the photographing lens 12 facing the front or set in the second state (Step SA2: NO), CPU 22 sets the operation to a PC camera mode and starts its operation in the PC camera mode at Step SA6. An image of a subject is photographed using CCD 21 at Step SA7, and the generated image data are successively sent to the personal computer at Step SA8. CPU 22 continues performing the operation in the PC camera mode until a key manipulation is performed on the digital camera or on the personal computer by the user to stop performing the operation in the PC camera mode, and CPU 22 finishes the operation in the PC camera mode when such key manipulation is performed (Step SA9: YES).

As described above, when the user uses a data communication function between the digital camera 10 mounted on the cradle 1 and the personal computer, the user simply can set his/her desired operation mode (the recorded image-data transferring mode or the PC camera mode) of the digital camera 10 by selectively setting the digital camera 10 in the cradle 1 in the first state or in the second state. In other words, the user can set the operation mode in a very simple way to use the data communication function.

In the present embodiment set forth above, the holding unit 3 of the cradle 1 is configured so as to hold the digital camera 10 in a slightly backward tilting state, and the states in which the digital camera 10 is held in the cradle 1 have a certain relationship with the operation mode of the digital camera 10. That is, the operation mode of the digital camera 10 is set to the recorded image-data transferring mode when the digital camera 10 is set to the cradle with the liquid crystal display 13 facing the front, and the operation mode of the digital camera 10 is set to the PC camera mode when the digital camera 10 is set to the cradle with the photographing lens 12 facing the front.

As the cradle 1 is configured as set forth above, the user easily can monitor images displayed on the liquid crystal display 13 in the recorded image-data transferring mode, and the user can fix an appropriate photographing condition in the PC camera mode since the digital camera 10 is held with the photographing lens tilted back.

Further in the present embodiment, when the digital camera 10 with the power being turned on is mounted on the cradle 1, the digital camera 10 automatically works in the recorded image-data transferring mode or in the PC camera mode, but the digital camera may be designed such that the power is automatically turned on at the time when the digital camera 10 is mounted on the cradle 1 and the camera connector 15 is connected to the cradle connector 5.

Further in the digital camera 10 according to the present embodiment, the operation mode of the digital camera 10 is selectively set to the recorded image-data transferring mode or to the PC camera mode depending on the state in which the digital camera 10 is mounted on the cradle 1, but the digital camera 10 may be designed to be set to an operation mode other than the operation modes such as the recorded image-data transferring mode and the PC camera mode. For example, the digital camera 10 may be designed to work in the operation modes of any kind or operation whatsoever, such as a charging mode and an image-data transferring mode, the charging mode and a setting mode (a customizing mode) in which the digital camera is set to a user's desired mode, a self timer mode and the image-data transferring mode, a music reproducing mode and a music-data and image-data transferring mode.

Second Embodiment

Figure 4:
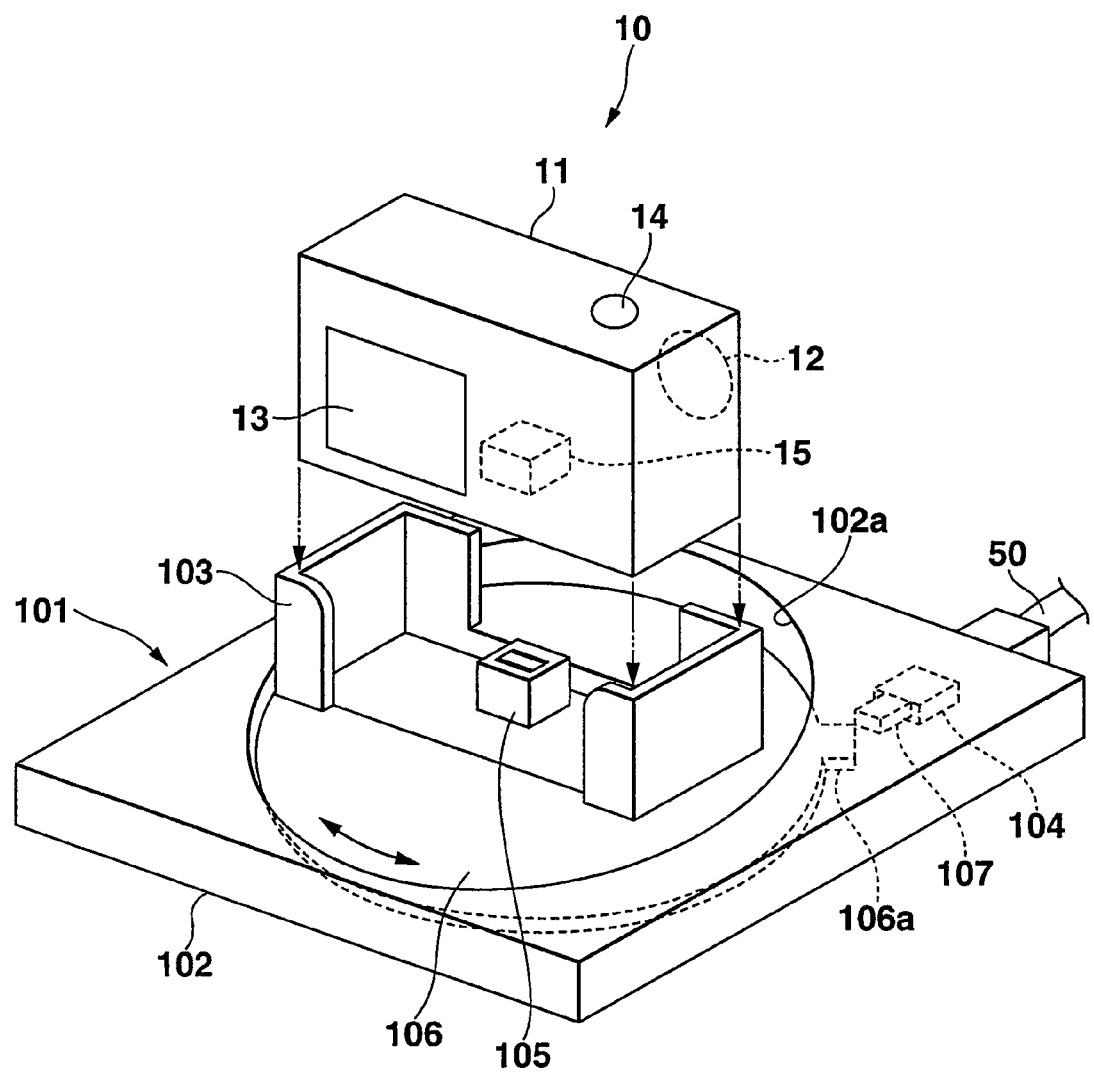
FIG. 4 is an external perspective view of a connecting system according to a second embodiment of the invention.

FIG. 4 is a view illustrating a perspective external view of a connecting system according to a second embodiment of the invention. The connecting system includes a connecting mounting or a cradle 101 and a digital camera 10 which is mounted on the cradle 1. When held by or mounted on the cradle 1, the digital camera 10 is electrically connected to a personal computer (PC) through the cradle 101 to exchange data therewith.

The cradle 101 has a base 102 in the top of which a round opening 102a is formed, and a rotating round table 106 which is rotatably mounted within the round opening 102a. The rotatable round table 106 is a moving member of the connecting system of the invention, and on the top surface of the rotatable round table 102 is provided a holding unit 103. The rotatable table 106 is allowed to rotate in a horizontal plane parallel to the base 102 by more than 180 degrees, and has a projection 106a on its peripheral surface.

Figure 5:
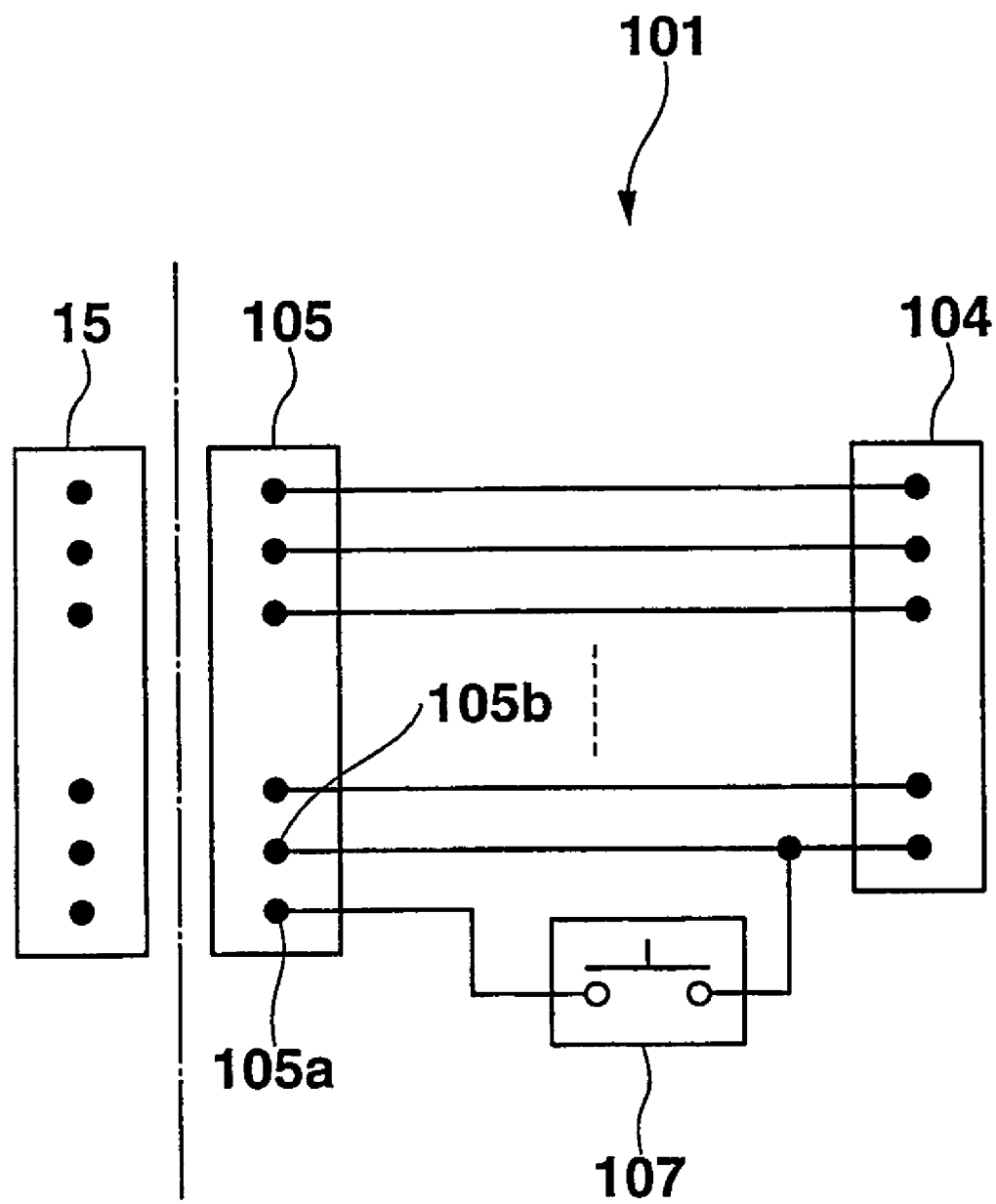
FIG. 5 is a view showing a circuit of the cradle.

A first connector 104 is provided in a rear face of the base 102, and a second connector 105 is mounted on the rotatable round table 106 within the holding unit 103. The connecting terminals of the first connector 104 are connected to the corresponding connecting terminals of the second connector 105 in the base 102. Meanwhile, the second connector 105 has a detecting terminal 105a in addition to the connecting terminals for data communication as shown in FIG. 5. The detecting terminal 105a detects a rotational position of the rotatable round table 106. An on-off switch 107 is integrally provided to the connecting connector 104 and is used to close or open a circuit between the detecting terminal 105a and a predetermined data communication terminal 105b. The on-off switch 107 is a micro-switch which is operated by the projection 106a mounted on the rotatable round table 106. The micro-switch is depressed by the projection 106a to make the circuit when the rotatable round table 106 rotates by a predetermined angle as indicated in dotted lines in FIG. 4.

The external view and the circuit configuration of the digital camera 10 according to the second embodiment are similar to the first embodiment. In the second embodiment, when the digital camera 10, the power of which is turned on, is set to the cradle 101 connected to the personal computer (PC) through the communication cable 50, the digital camera 10 works as described below.

In the digital camera 10, CPU 22 detects an output at the second connector 105 of the cradle 101 that is connected to the personal computer through the communication cable 50, to judge whether the on-off switch 107 is closed or open and to determine whether the digital camera 10 mounted on the holding unit 103 is held by the base 102 of the cradle 101 with the liquid crystal display 13 facing the front or facing the rear.

When the on-off switch 107 is closed or on, and when the digital camera 10 is held on the cradle 101 with the liquid crystal display 13 facing the front as shown in FIG. 4, the digital camera 10 is automatically set to the recorded image-data transferring mode and all the image data (image files) stored in the built-in memory 29 are transferred to the personal computer in a similar way in the processes performed at Steps SA3 through SA5 of FIG. 3. Meanwhile, when the on-off switch 107 is open or off, and when the digital camera is held on the cradle 101 with the liquid crystal display 13 facing the rear, the digital camera is automatically set to the PC camera mode and image data generated with CCD 21 are successively sent to the personal computer until a key is manipulated to stop performing the operation in the PC camera mode.

As described above, when the user uses the data communication function between the digital camera 10 held on the cradle 101 and the personal computer, the user can set the digital camera 10 to his/her desired operation mode (the recorded image-data transferring mode or the PC camera mode) by selectively changing the direction of the digital camera 10 relative to the base 102 of the cradle 101 by rotating the rotatable round table 106 on which the digital camera 10 is mounted. Therefore, when using the data communication function, the user can set the operation mode in a very simple manner. Further, according to the cradle 101 of the second embodiment, the operation mode can be set with the digital camera 10 mounted on the cradle 101. The cradle 101 can be used conveniently, because the user is not required to set the digital camera 10 to the cradle 101 every time the operation mode is changed.

Further, the cradle 101 can be modified as follows. That is, plural detecting switches are provided on the base 102 at plural positions to detect the rotational position of the projection 106a of the rotatable round table 106, which allows the digital camera 10 held on the rotatable table 106 to face in plural directions. Using the structure of the cradle 101, plural operation modes may be set to the digital camera 10 by selectively rotating the rotatable table 106.

In the second embodiment, when the digital camera 10 with the power being turned on is installed on the cradle 101, the digital camera 10 automatically works in the recorded image-data transferring mode or in the PC camera mode, but the digital camera may be configured such that the power is automatically turned on at the time when the digital camera 10 is installed on the cradle 101 and when the camera connector 15 is connected to the cradle connector 105.

Further in the digital camera 10 according to the second embodiment, the operation mode of the digital camera 10 is selectively set to the recorded image-data transferring mode or to the PC camera mode depending on the rotational position of the rotatable table 106 on which the digital camera 10 is mounted, but the digital camera 10 may be configured to be set to an operation mode other than the data communication mode, as described in the first embodiment.

Third Embodiment

Figure 6:
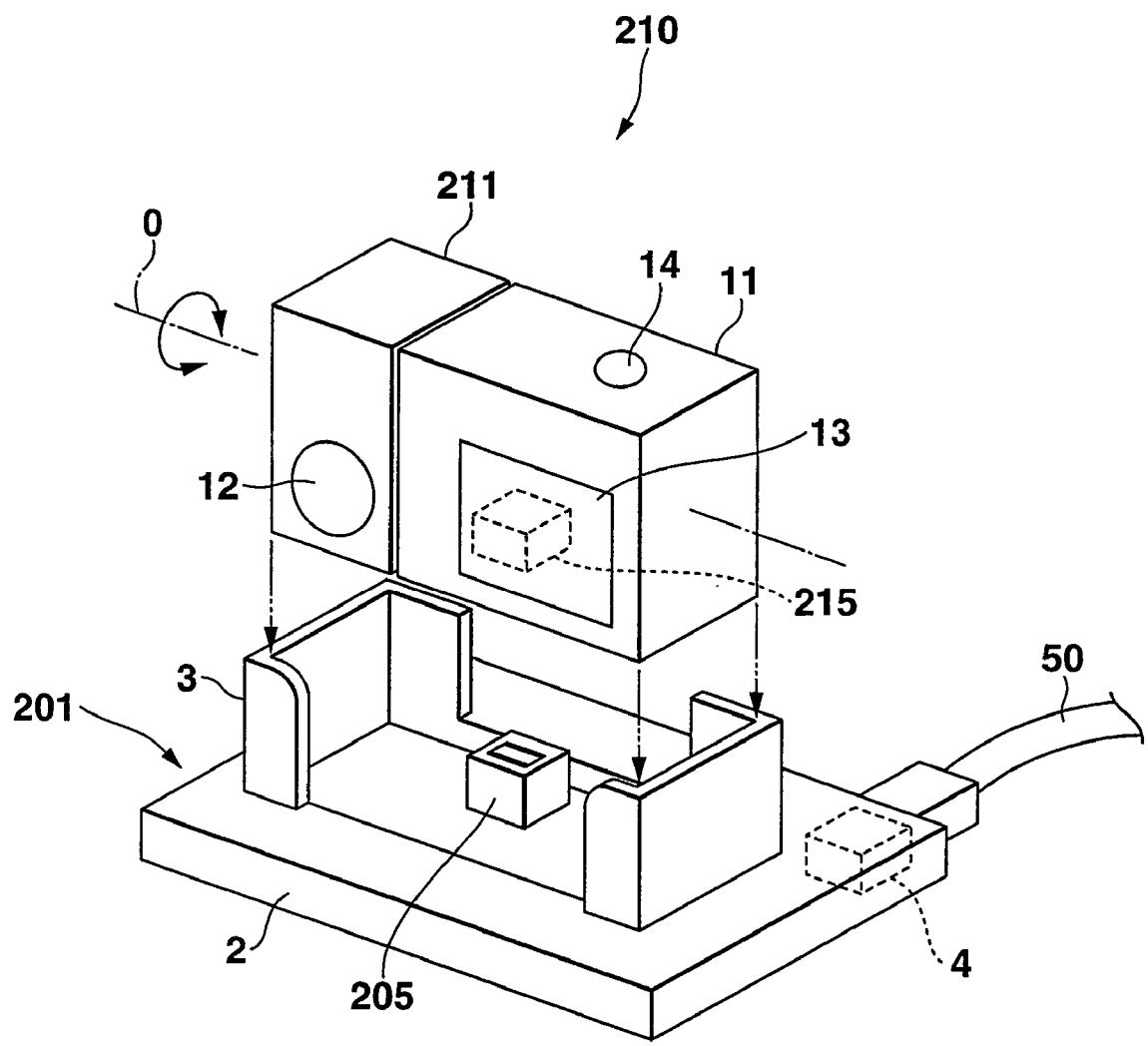
FIG. 6 is an external perspective view of a connecting system according to a third embodiment of the invention.

FIG. 6 is a view illustrating a perspective external view of a connecting system according to a third embodiment of the invention. The connecting system includes a connecting mounting or a cradle 201 and a digital camera 210 which is mounted on the cradle 201. When held by or mounted on the cradle 201, the digital camera 210 is electrically connected to a personal computer (PC) through the cradle 201 to exchange data therewith.

The cradle 201 in the third embodiment is of a substantially same structure as the first embodiment, but is different from the first embodiment in that a second connector 205 provided within the holding unit 3 has only one set of data communication terminals.

The digital camera 210 in the third embodiment is different from those of the first and the second embodiments. The digital camera 210 has a movable portion 211 on a side wall of the camera body 11. More specifically, the movable portion 211 is rotatably mounted on the side wall about an axis "O" which penetrates through the camera body 11 from the side wall to other side wall, as illustrated in broken lines in FIG. 6. The movable portion 211 is rotatable about the axis more than 180 degrees (for example, 270 degrees), and has the photographing lens 12 and CCD 21. A connector 215 is provided in the bottom surface of the camera body 11 and corresponds to a second connector 205 provided on the cradle 201. The connector 215 is electrically connected to the second connector 225, when the camera body 11 is mounted on the holding unit 3 of the cradle 201 with the liquid crystal display 13 facing the front of the cradle 201 as shown in FIG. 6. In the description below, the second connector 205 of the cradle 201 is referred to as a cradle connector and the connector 215 of the digital camera 210 is referred to as a camera connector only for a simplicity purpose.

Figure 7:
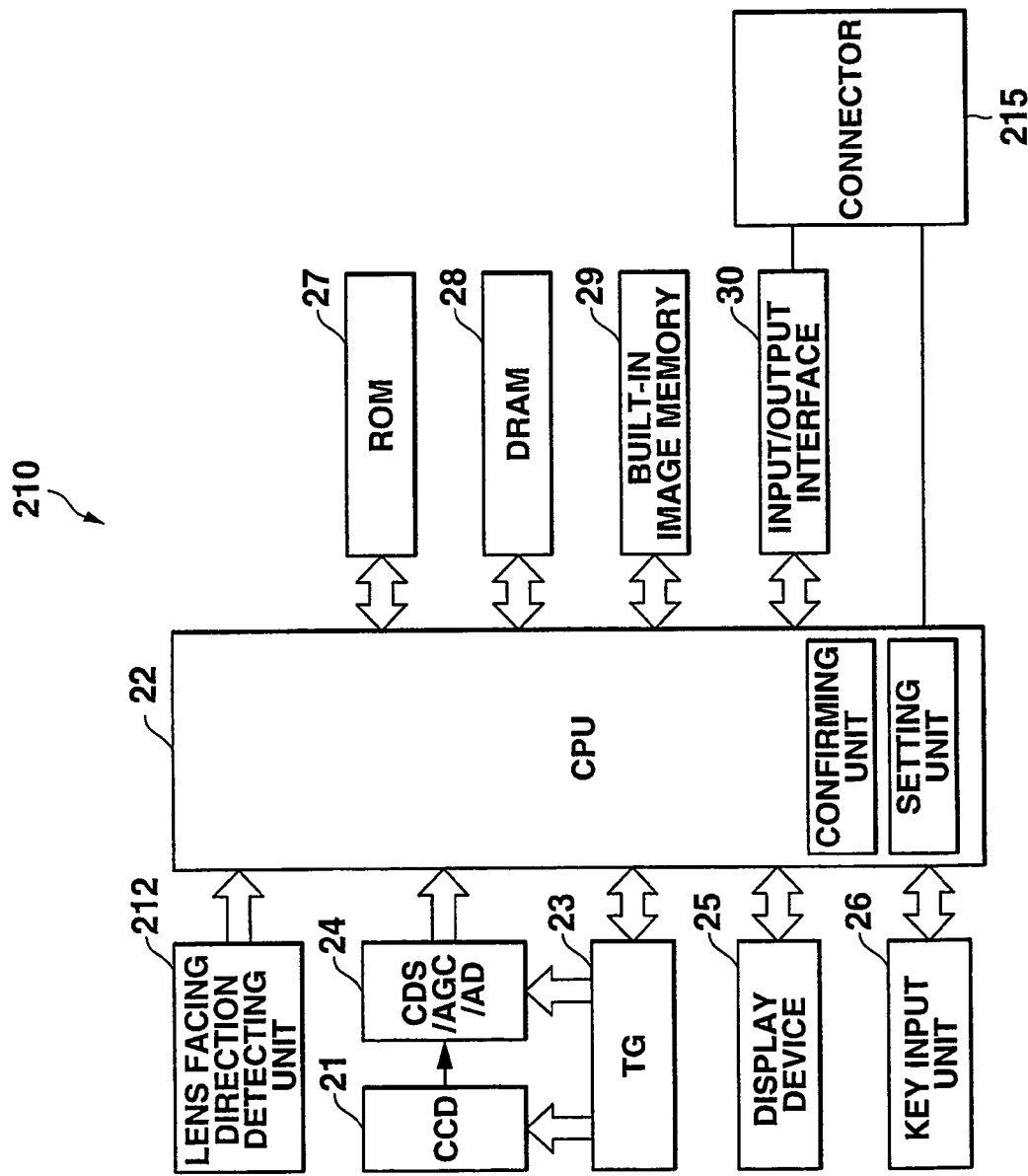
FIG. 7 is a block diagram showing a circuit configuration of a digital camera of the third embodiment.

The digital camera 210 has a direction detecting unit 212 for detecting a photographing direction as shown in FIG. 7. The direction detecting unit 211 detects the direction of the photographing lens 12, and includes a detecting switch (not shown) which is made to close when the movable portion 211 is held with the photographing lens 121 facing the front of the cradle 210 or facing the same direction as the liquid crystal display 13 of the camera body 11, and a circuit which sends to CPU 22 a detection signal that indicating the photographing direction when the movable portion 211 is held with the photographing lens 12 facing the front. The connecting system according to the third embodiment has the similar construction to the first and the second embodiments except mentioned above.

Figure 8:
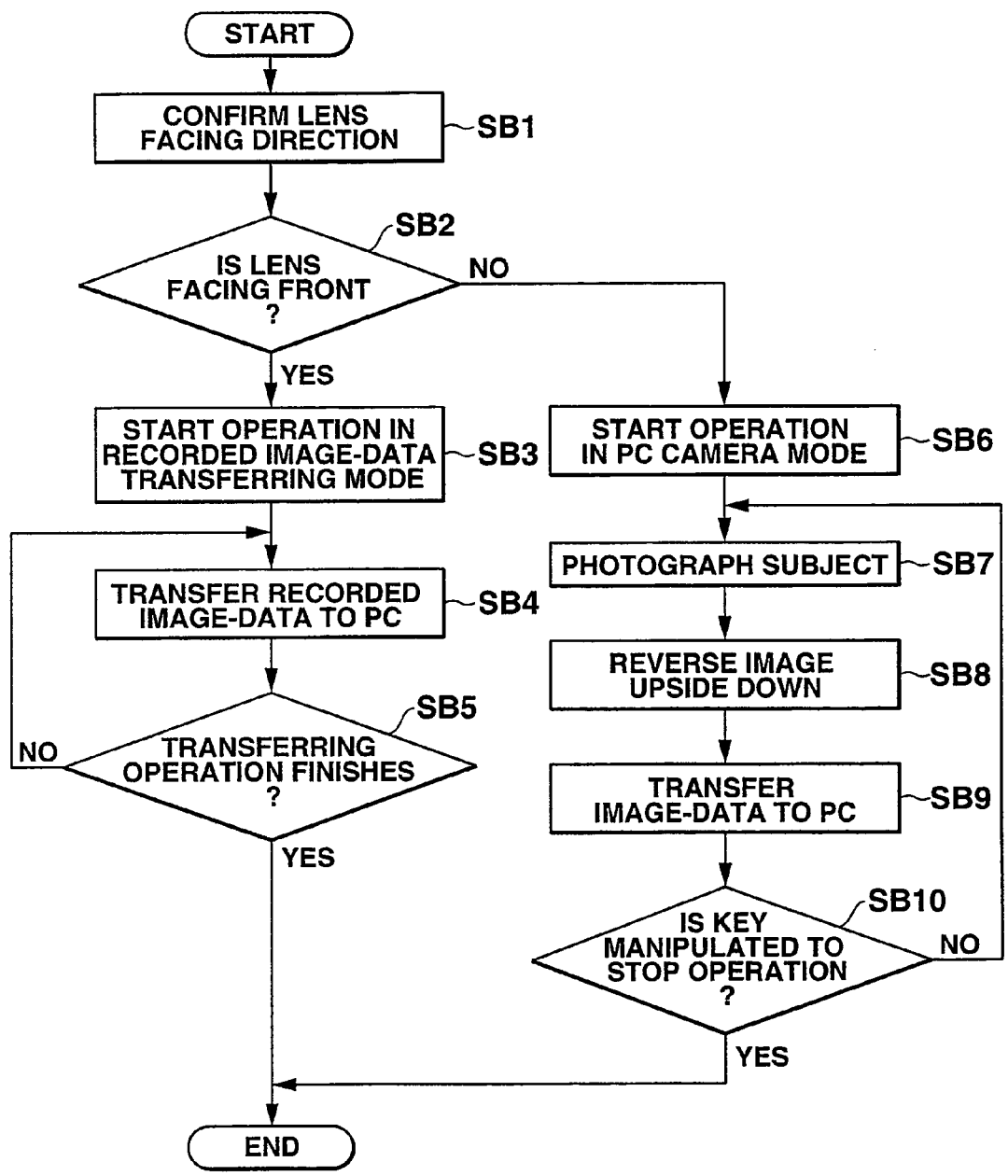
FIG. 8 is a flow chart showing processes performed by the digital camera when the digital camera is mounted on a cradle.

In the third embodiment, when the digital camera 210, the power of which is turned on, is set to the cradle 201 connected to the personal computer (PC) through the communication cable 50, the digital camera 210 works in accordance with the flow chart shown in FIG. 8.

When the camera connector 215 is connected to cradle connector 205, the digital camera 210 detects depending on the detection signal output from the direction detecting unit 212 at Step SB1 to which direction the photographing lens 12 faces. When the detection switch of the direction detecting unit 212 is off and the photographing lens 12 faces the front of the camera body 11 and the rear of the cradle 201 (Step SB2: YES), CPU 22 sets the operation mode to the recorded image-data transferring mode and starts performing the operation in the recorded image-data transferring mode at Step SB3. CPU 22 reads out image data (image files) from the built-in image memory 29 in a predetermined order and transfers the read out image data to the personal computer at Step SB4. CPU 22 continues reading out and transferring the image data to the personal computer until all the image data have been transferred to the personal computer, and finishes the operation in the recorded image-data transferring mode when all the image data have been transferred to the personal computer (Step SB5: YES).

Meanwhile, when it is confirmed that the movable portion 211 is held with the photographing lens 12 facing the rear of the camera body 11 and the front of the cradle 201 as shown in FIG. 6 (Step SB2: NO), CPU 22 sets the operation to a PC camera mode and starts its operation in the PC camera mode at Step SB6. An image of a subject is photographed using CCD 21 at Step SB7, and the generated image data are reversed upside down at Step SB8, and then successively sent to the personal computer at Step SB9. CPU 22 continues performing the operation in the PC camera mode until a key manipulation is performed on the digital camera 210 or on the personal computer by the user to stop performing the operation in the PC camera mode, and CPU 22 finishes the operation in the PC camera mode when such key manipulation is performed (Step SB10: YES).

As described above, when the user uses a data communication function between the digital camera 210 mounted on the cradle 201 and the personal computer, the user simply can set his/her desired operation mode (the recorded image-data transferring mode or the PC camera mode) of the digital camera 210 by selectively rotating the movable portion 211 (the photographing lens 12) of the digital camera 210. In other words, the user can set the operation mode in a very simple way to use the data communication function. The digital camera 210 has an advantage similar to the second embodiment that the operation mode can be changed with the digital camera 210 installed in the cradle 201.

If the digital camera 210 has a detection switch which can detect plural directions of the movable portion 211 (the photographing lens 12), and the digital camera 210 can detect the plural directions of the movable portion 211 relative to the cradle 201. The digital camera 210 having the above detection switch can be set to more than three operation modes depending on the directions of the photographing lens 12.

In the second embodiment, when the digital camera 210 with the power being turned on is installed on the cradle 201, the digital camera 210 automatically works in the recorded image-data transferring mode or in the PC camera mode, but the digital camera may be configured such that the power is automatically turned on at the time when the digital camera 210 is installed on the cradle 201 and when the camera connector 215 is connected to the cradle connector 205.

Further in the digital camera 210 according to the third embodiment, the operation mode of the digital camera 210 is selectively set to the recorded image-data transferring mode or to the PC camera mode depending on the directions of the movable portion 211 of the digital camera 210, but the digital camera 10 may be designed to be set to an operation mode other than the data communication mode, as described in the first and the second embodiments.

Fourth Embodiment

In a forth embodiment, a personal computer (PC) is described, which serves as a data processing apparatus of the present invention that exchanges data with the digital camera 10 through the cradle 1 described in the first embodiment.

Figure 9:
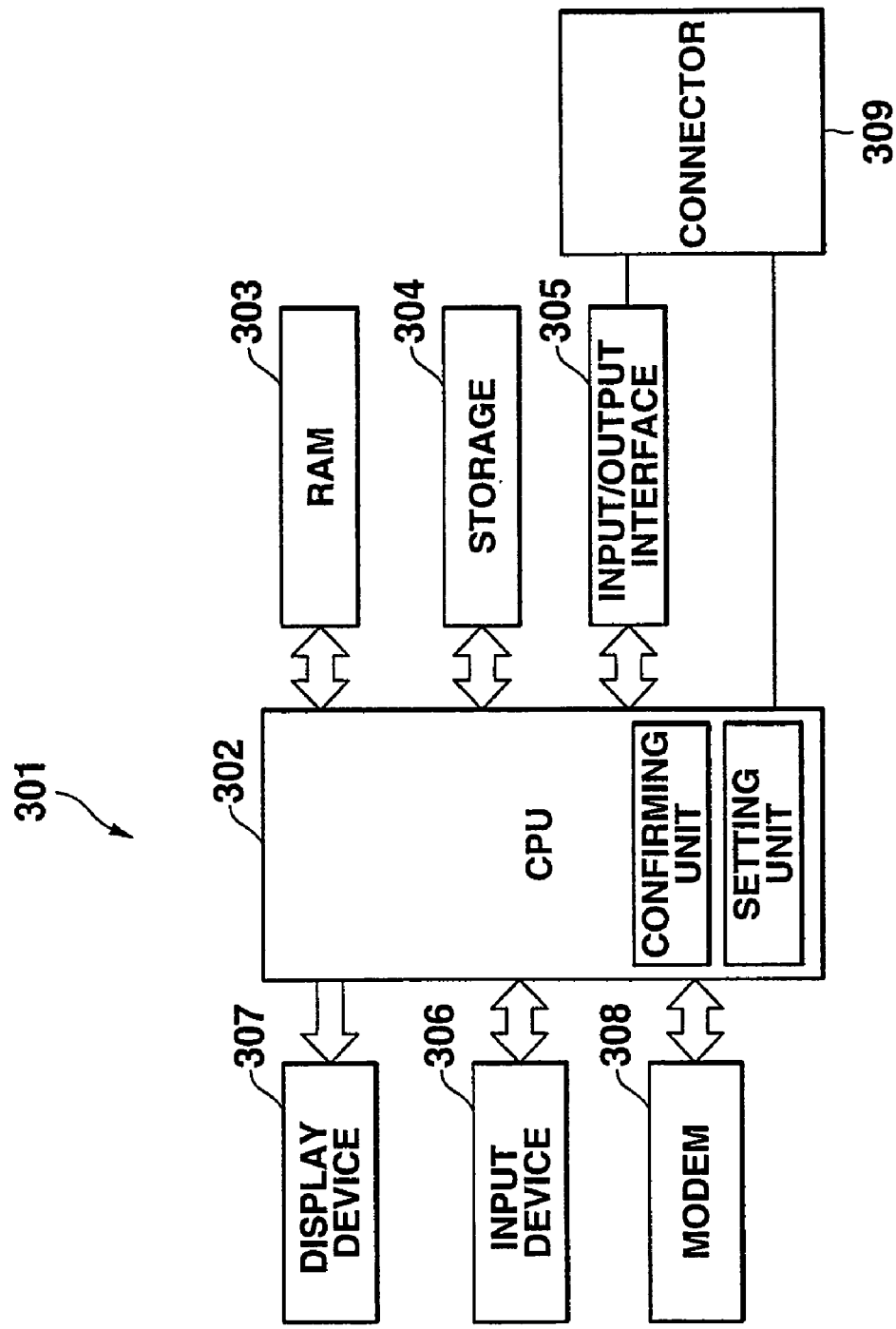
FIG. 9 is a block diagram showing a circuit configuration of a personal computer according to a fourth embodiment.

FIG. 9 is a block diagram illustrating a circuit configuration of the personal computer 301 according to the fourth embodiment. The personal computer 301 has CPU 302, RAM 303, a storage 304, an input-output interface 305, an input devices 306 such as a keyboard and a mouse, a display device 307 such as LCD and CRT, and a modem 308 for connecting to the Internet through the telephone lines.

The input-output interface 305 is connected to a connector 309, to which the communication cable 50 (shown in FIG. 1) is connected. The input/output interface 305 is connected to the digital camera 10, and through which interface 305 (USB interface or RS-232C interface) data is exchanged under control of CPU 22 between the digital camera 10 and the personal computer 301 connected to the digital camera 10 through the cradle 1. The storage is a hard disc drive with a comparatively large storage capacity.

An operating system and plural application programs are stored in the storage 304. In the fourth embodiment, a cradle program which comes with the cradle 1, an image-data take-in program for taking in image data, and an image-data upload program are stored in the storage 304. The image-data upload program is used to successively upload images to a web site on the Internet such as user's home page, which images are taken in with the digital camera 10, which is used as a personal computer camera (a Web camera). Further in the fourth embodiment, CPU 302 works under the cradle program to function as a confirming unit and a setting unit.

Figure 10:
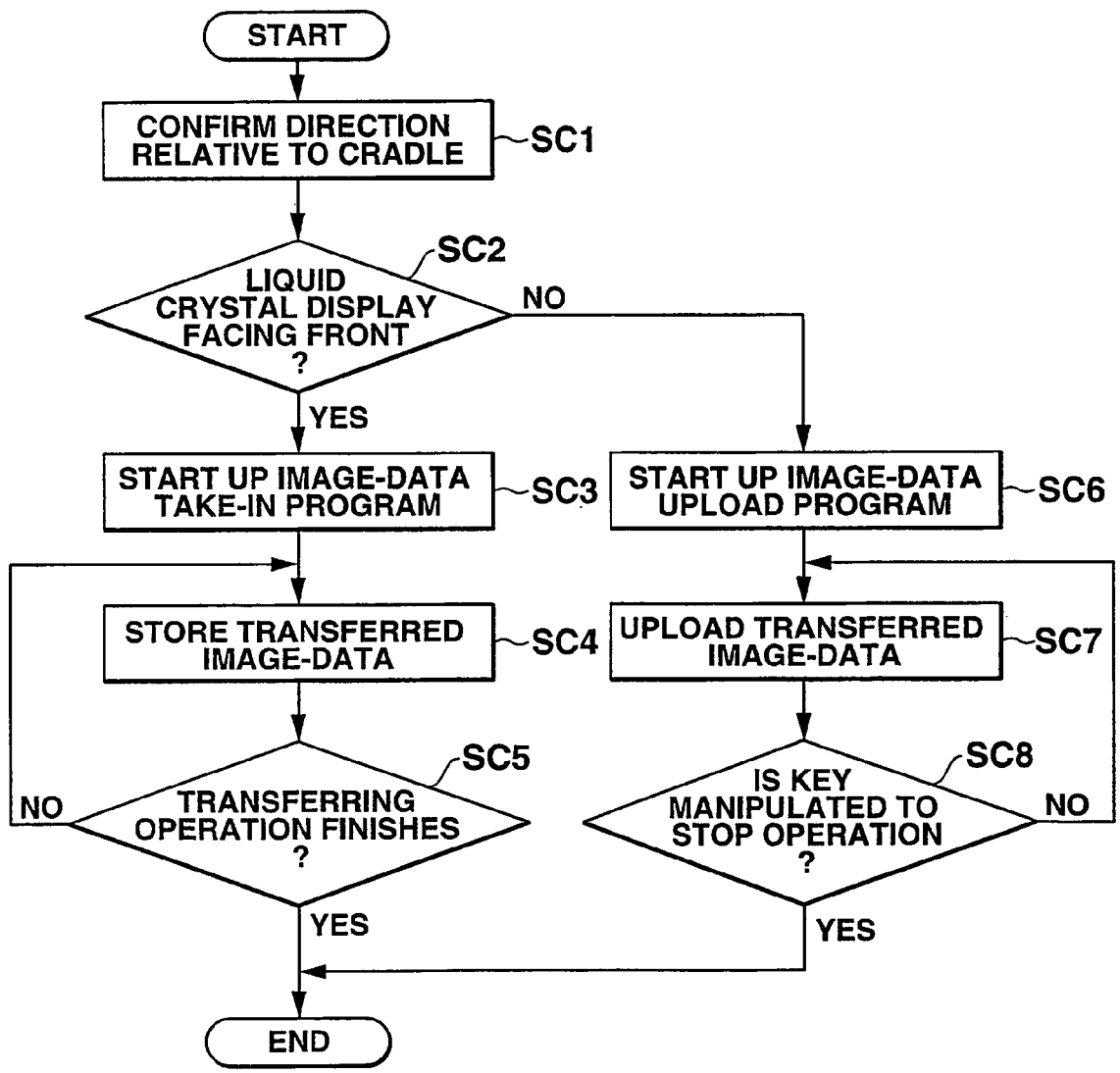
FIG. 10 is a flow chart showing processes performed by the personal computer.

Now, the operation of the personal computer 301 will be described with reference to the flow chart shown in FIG. 10. It is assumed that the personal computer 301 is connected to the cradle 1 with the digital camera 10 installed and has started up with the cradle program remaining, and that a start-up program has been set to the cradle program as will be set forth later.

When the personal computer 301 is installed in the cradle 1, CPU 302 electrically judges which terminal arrays 5a, 5b of the cradle connector 5 the connecting terminals of the camera connector 15 are connected to, and determines at Step SC1 whether the digital camera 10 is installed in the cradle 1 with the liquid crystal display 13 facing the front (first direction, shown in FIG. 11) or with the photographing lens 12 facing the front (second direction).

When it is determined at Step SC2 (YES) that the digital camera 10 is installed in the cradle 1 with the liquid crystal display 13 facing the front (the first direction), CPU 302 makes the image-data take-in program start up and begins to store image data transferred from the digital camera 10 in a predetermined area in the storage 304 at Step SC3. Thereafter, CPU 302 continues storing in the storage 304 image data transferred from the digital camera 10 at Step SC4. When CPU 302 receives from the digital camera 10 a signal indicating that all the image data have been transferred (Step SC5: YES), the operation under the data program finishes.

Meanwhile, when it is determined at Step SC2 (NO) that the digital camera 10 is installed in the cradle 1 with the photographing lens 12 facing front (second direction), CPU 302 makes the image-data upload program start up at Step SC6. Further, CPU 302 receives image data successively transferred from the digital camera 10. On the other hand, CPU 302 prepares to reach to the Internet through the modem 308 and uploads the picked-up image data to the Internet through the modem 308 at Step SC7. Upon the user's stop-operation, the operation under the image-data upload program finishes (Step SC8: YES).

In the fourth embodiment, requiring no user's troublesome manipulation the personal computer 301 automatically performs an image-data receiving operation or an internet-upload operation depending on whether the digital camera 10 is installed with the liquid crystal display facing 13 the front or with the photographing lens 13 facing the front. The fourth embodiment allows the user to exchange image data between the personal computer 301 and the digital camera 10 in a very simple manner.

In the fourth embodiment, the personal computer 301 selectively performs the image-data receiving operation or the internet-upload operation. But it may be possible to store a program other than the application programs set forth above in the storage 304 and to make the personal computer 301 perform a data communication operation different from those set forth above. For example, it may be useful to make the personal computer 301 transfer data or image data stored in the storage 304 to the digital camera 10 and to make the digital camera 10 store the data or the image data in the built-in memory 29. In the fourth embodiment, the personal computer which is connected to the cradle 1 of the first embodiment is described, but the personal computer, which is connected to the cradle 101 of the second embodiment or the cradle 201 of the third embodiment, will show similar advantages.

Further in the fourth embodiment, the digital camera 10 has the function to judge whether the camera 10 itself is installed in the cradle 1 with the liquid crystal display 13 facing the front or with the photographing lens facing the front and to automatically set the recorded image-data transferring mode or the personal camera mode depending on the result of the judgment, and the personal computer 301 judges whether the camera 10 is installed in the cradle 1 with the liquid crystal display 13 facing the front or with the photographing lens 12 facing the front and automatically selects the application program depending on the result of the judgment. But it may be possible to store a cradle program different from the cradle program described in the fourth embodiment and to make the personal computer 301 perform operations set forth below.

For instance, before or after the image-data take-in program or the image-data upload program starts up at Step SC3 or SC6, it may be possible to send a request signal for setting the recorded-image transferring mode to the digital camera 10 through the cradle 1, when the digital camera 10 is installed with the liquid crystal display facing 13 the front, and to send a request signal for setting the PC camera mode to the digital camera 10 through the cradle 1, when the digital camera 10 is installed with the photographing lens 13 facing the front. That is, the CPU 302 and the input-output interface 30 may be configured to function as an operation request unit of the present invention.

In this case, a program, which controls CPU 22 to set the operation mode in response to the request signal set forth above, is stored in ROM 27 of the digital camera 10, and the same advantages of the fourth embodiment will be obtained.

Fifth Embodiment

Figure 11:
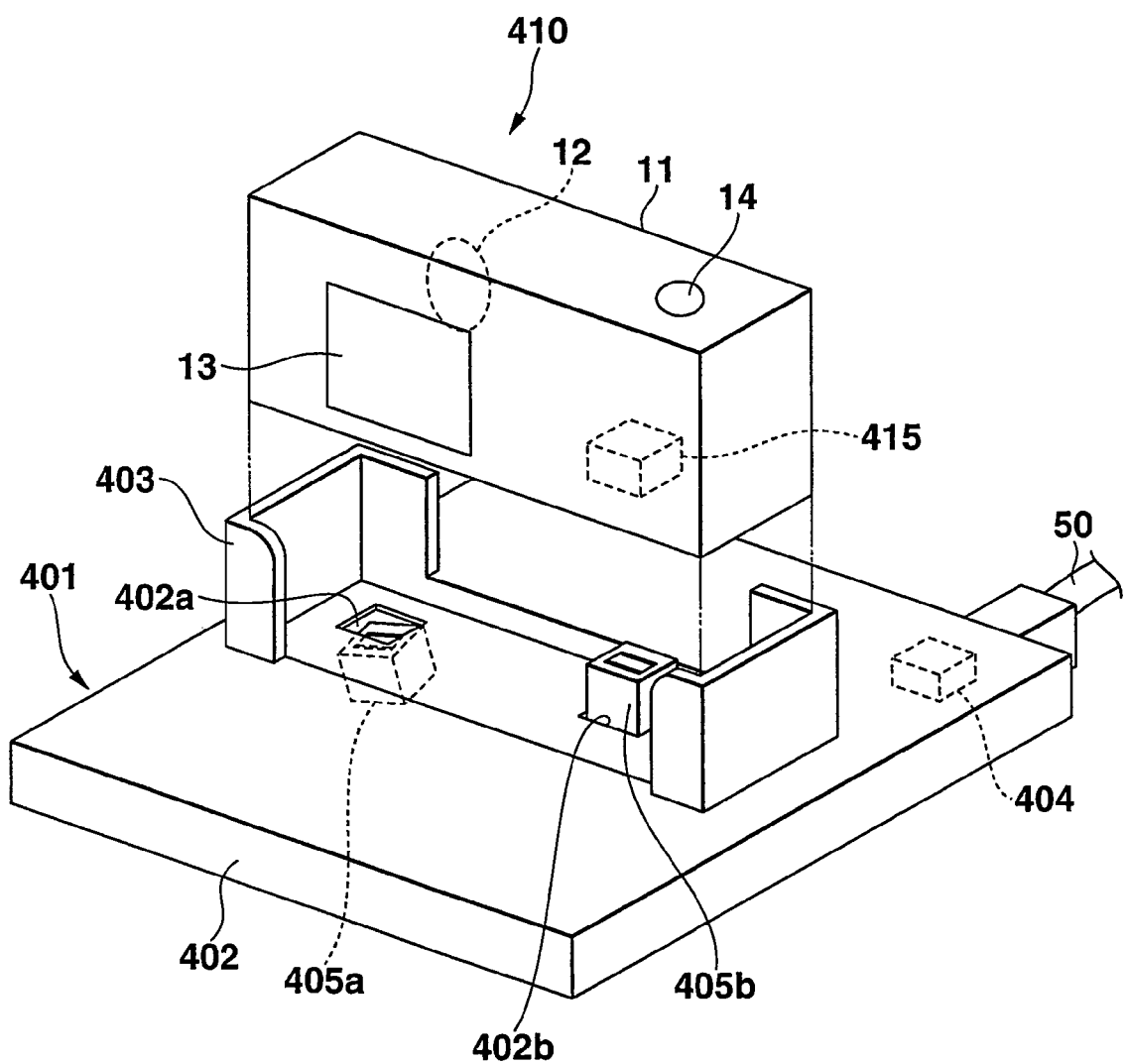
FIG. 11 is an external perspective view of a connecting system according to a fifth embodiment of the invention.

FIG. 11 is a view illustrating a perspective external view of a connecting system according to a fifth embodiment of the invention. The connecting system includes a connecting mounting or a cradle 401 and a digital camera 410 which is mounted on the cradle 401. When mounted on the cradle 401, the digital camera 410 is electrically connected to a personal computer (PC) through the cradle 401 to exchange data therewith.

The cradle 401 has a base housing 402 and a holding unit 403 mounted on the top of the base housing 402. The holding unit 403 mounted on the base housing 402 receives and holds the digital camera 410 with being slightly tilted back. The base housing 402 has a first connector 404 on its rear side, to which connector 404 the communication cable 50 is connected. The communication cable 50 is also connected to a personal computer (not shown) at other end.

A pair of rectangular holes 402a and 402b are formed in the top surface of the base housing 402 of the cradle 401 on an imaginary line parallel with the front edge of the base housing 402 and within an area surrounded by the holding unit 403.

Figure 12A:
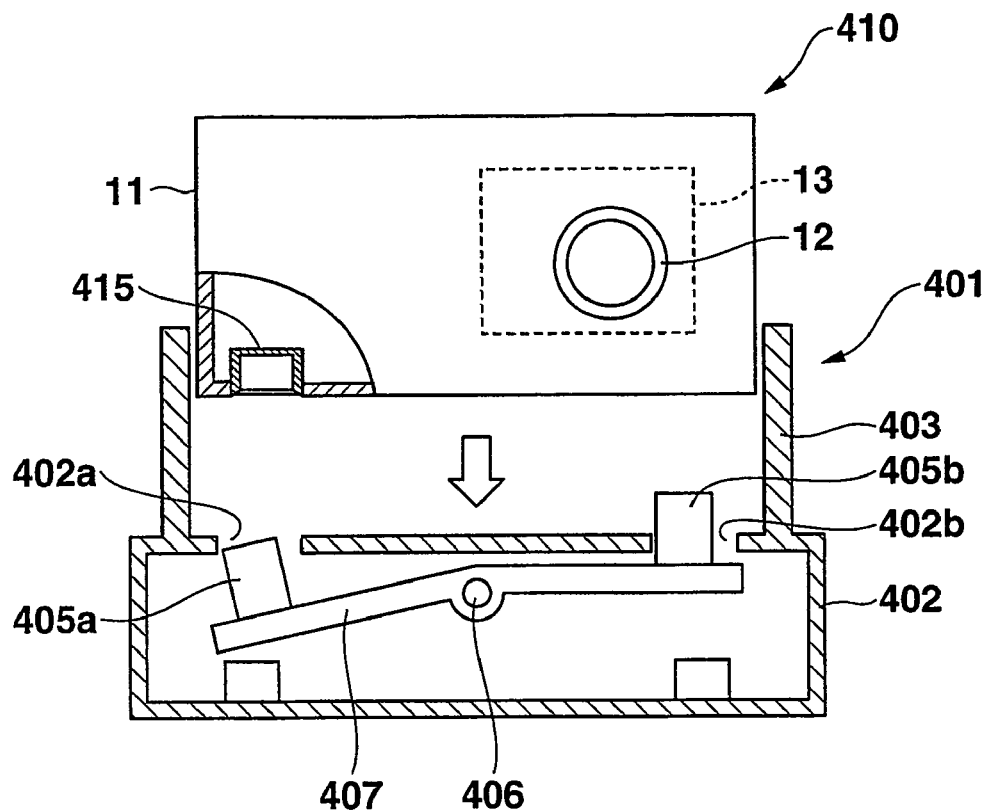
FIG. 12A is a cross sectional view illustrating main portions of the cradle and the digital camera before the digital camera is mounted on the cradle.
Figure 12B:
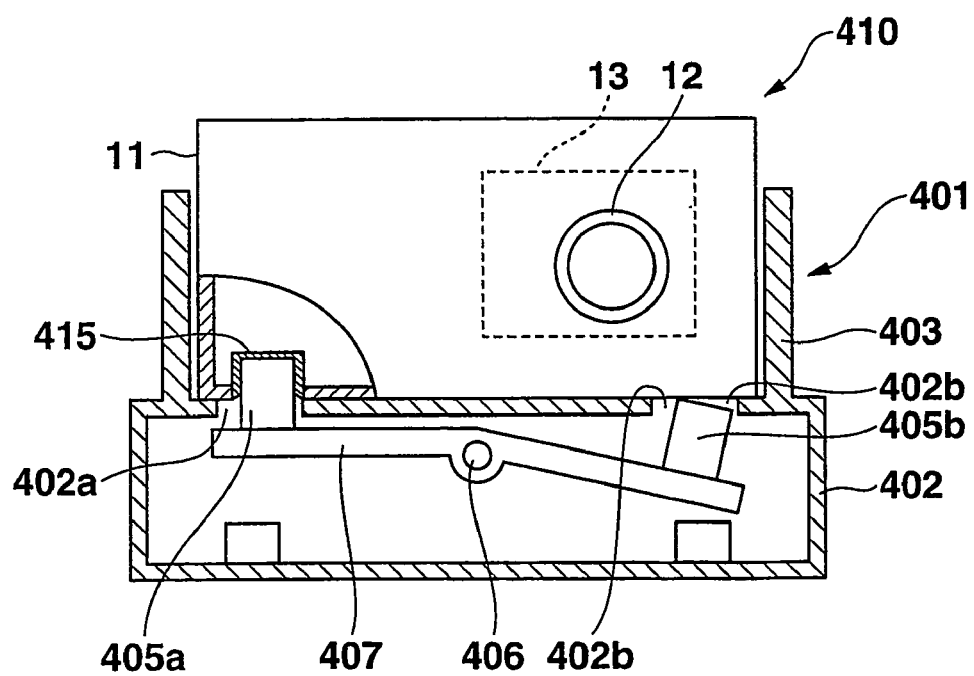
FIG. 12B is a cross sectional view illustrating main portions of the cradle and the digital camera after the digital camera has been mounted on the cradle.

As shown in a cross-sectional views of FIGS. 12A and 12B, within the base housing 402 a supporting axis 406 is provided running across perpendicular to the imaginary line between the pair of rectangular holes 402a, 402b. A movable elongated member 407 is rotatably supported on the supporting axis 406. The movable elongated member 407 has second connectors 405a, 405b on its both end portions, which connectors 405a and 05b are connected to the first connector 404 in the rear side of the base housing 402. The movable elongated member 407 is of a shape in a way that its both ends are slightly bent down. When the movable member 407 is turned about the supporting axis 406 in the counter clockwise direction, the connector 405b on one end of the movable member 407 penetrates through the rectangular hole 402b formed in the tope surface of the base housing 402, appearing within the holding member 403 and the connector 405a on the other end on the movable member 407 recedes from the rectangular hole 402a, as shown in FIG. 12A. On the contrary, when the movable member 407 is turned about the supporting axis 406 in the clockwise direction, the connector 405a on one end of the movable member 407 penetrates through the rectangular hole 402a formed in the tope surface of the base housing 402, appearing within the holding member 403 and the connector 405b on the other end of the movable member 407 recedes from the rectangular hole 402b, as shown in FIG. 12B. In short, the connectors 405a and 405b are alternatively appear from the rectangular holes 402a and 402b of the base housing 402, every time when the movable member 407 is turned about the supporting axis 406 in the clockwise direction or in the counter-clockwise direction.

Figure 13:
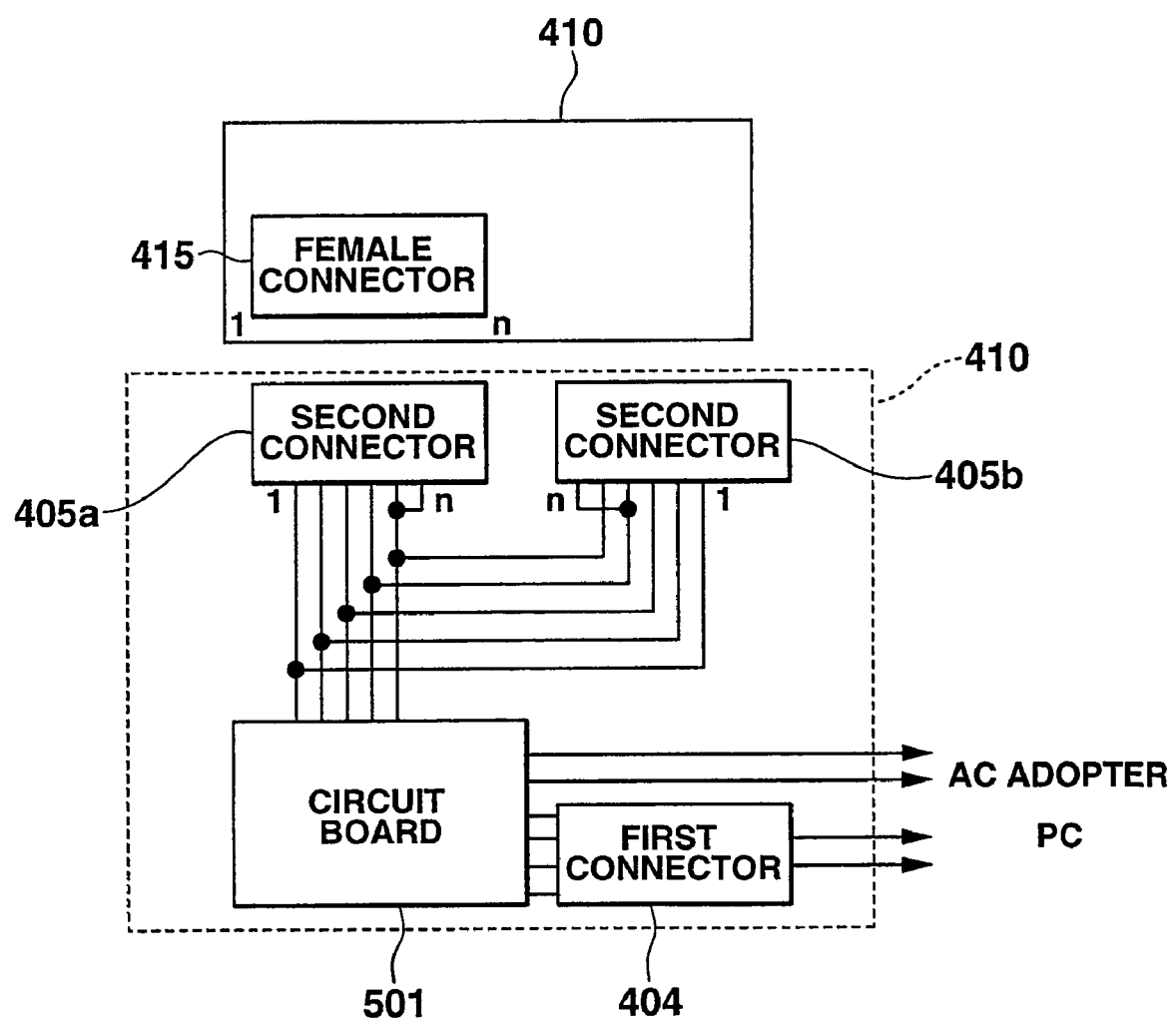
FIG. 13 is a view showing a circuit configuration of the cradle.

FIG. 13 is a view showing a circuit configuration of the cradle 401. The connectors 405a, 405b have plural terminals "1," "2," through "n," respectively, and these terminals are connected to each other, except the n-th terminals, and are connected to a circuit board 501, and are further connected to the first connector 404 through the circuit board 501, as shown in FIG. 13. An AC adopter is connected to the circuit board 501 through either of the second connectors 405a, 405b for supplying the power to the digital camera 410. The n-th terminal of each of the second connectors 405a, 405b is connected to a terminal (data communication terminal) of other number of other connector 405a or 405b. The terminals of the second connectors 405a, 405b are connected to the movable member 407 in a reverse order to each other.

Similarly to those described in the first and second embodiments, the digital camera 410 in the fifth embodiment has the photographing lens 12 on the front surface of the camera body 11, the liquid crystal display 13 on its rear surface, the shutter button 14 on the top, and a female connector 415 in the bottom.

In the present embodiment, it should be noted that the digital camera 410 has the female connector 415 in the portion of the bottom that corresponds to either of the rectangular holes 402a and 402b of the base housing 402, when the digital camera 410 is mounted on the holding unit 403. More specifically, when the digital camera 410 is held with the liquid crystal display 13 facing the front by the cradle 401 as shown in FIG. 11, the female connector 415 of the digital camera 410 faces the rectangular hole 402b, and when the digital camera 410 is held with the photographing lens 12 facing the front by the cradle 401 as shown in FIGS. 12A and 12B, the female connector 415 of the digital camera 410 faces the rectangular hole 402a.

The digital camera 410 has the similar circuit configuration to those of the first and the second embodiments, but the female connector 415 of the digital camera 410 includes a power-supply terminal connected to a power unit (not shown) of the camera 410 unit.

In the connecting system of the present embodiment, when the digital camera 410 is mounted on the cradle 401 with the liquid crystal display 13 facing the front as shown in FIG. 11 (the first direction), the second connector 405a of the movable member 407 is pushed back into the base housing 402 by the camera body 11 and the other second connector 405b is pushed into the female connector 415 of the digital camera 410 to be electrically connected therewith. On the contrary, when the digital camera 410 is mounted on the cradle 401 with the photographing lens 12 facing the front as shown in FIGS. 12A and 12B (the second direction), the second connector 405b of the movable member 407 is pushed back into the base housing 402 by the camera body 11 and the other second connector 405a is pushed into the female connector 415 of the digital camera 410 to be electrically connected therewith. In short, whether the digital camera 410 is held with the liquid crystal display 13 facing the front or with the photographing lens 12 facing the front, the digital camera 410 is electrically connected with the cradle 401 through either of the second connectors 405a and 405b.

When the digital camera 410 according to the fifth embodiment is installed in the cradle 401 with power being on, the following operation is performed.

It is electrically detected to which number of data communication terminal the detection terminal (n-th terminal) is connected in order to determine to which second connector (cradle connectors) 405a or 405b the female connector (camera connector) 415 is connected. When it is determined that the digital camera 410 is mounted on the cradle 401 with the liquid crystal display 13 facing the front as shown in FIG. 11, the digital camera 410 is automatically set to the recorded image-data transferring mode in a similar way as described with reference to Steps SA3 through SA5 shown in FIG. 3. In the recorded-image transferring mode, all the image data (image files) stored in the built-in memory 29 are transferred to the personal computer. Meanwhile, when the digital camera 410 is mounted on the cradle 401 with the liquid crystal display 13 facing the rear as shown in FIGS. 12A and 12B, the digital camera 410 is automatically set to the PC camera mode in a similar way as described with reference to Steps SA6 through SA9 shown in FIG. 3. In the PC camera mode, all the generated image data are successively transferred to the personal computer until a stop operation is performed.

As described above, the user can selectively set his/her desired operation mode (the recorded image-data transferring mode or the PC camera mode) simply by installing the digital camera 410 in the cradle 401 with the liquid crystal display 13 facing the front or facing the rear.

The fifth embodiment provides an easy to use cradle. That is, simply by an installing the digital camera 410 onto the cradle 401, the user can bring either of the second connectors 405a, 405b of the cradle 401 to a connection position where the second connector is connected to the female connector 415 of the digital camera 410 and simultaneously bring other second connector to a withdrawn position in the base housing 402. It may be possible to configure the cradle such that the second connectors 405a and 405b are independently movable to the connection position or to the withdrawn position, and the second connectors are selectively connected to the female connector of the digital camera 410 by user's manual operation. The above modification will retain feature and improved usability of the digital camera and the cradle.

In the present fifth embodiment, when the digital camera 410 with the power being turned on is installed on the cradle 401, the digital camera 10 automatically works in the recorded image-data transferring mode or in the PC camera mode, but the digital camera may be configured such that the power is automatically turned on at the time when the digital camera 410 is installed on the cradle 401 and when the camera connector 415 is connected to either of the second connectors 405a, 405b.

Further in the digital camera 410 according to the present embodiment, the operation mode of the digital camera 410 is selectively set to the recorded image-data transferring mode or to the PC camera mode depending on the state in which the digital camera 410 is installed on the cradle 401, but the digital camera 410 may be configured to be set to an operation mode other than the operation modes such as the recorded image-data transferring mode and the PC camera mode.

In the fifth embodiment, the detection terminal (n-th terminal) included in each of the second connectors 405a, 405b is connected to a terminal (data communication terminal) having a different number of the other second connector, and when the digital camera 410 is installed in the cradle 401, it is confirmed to which second connector 405a or 405b the connector 415 of the digital camera 410 is connected by electrically detecting to what number of the terminal the detection terminal (n-th terminal) is connected. But modification may be made to the structure of the cradle 401 as described below.

Figure 14A:
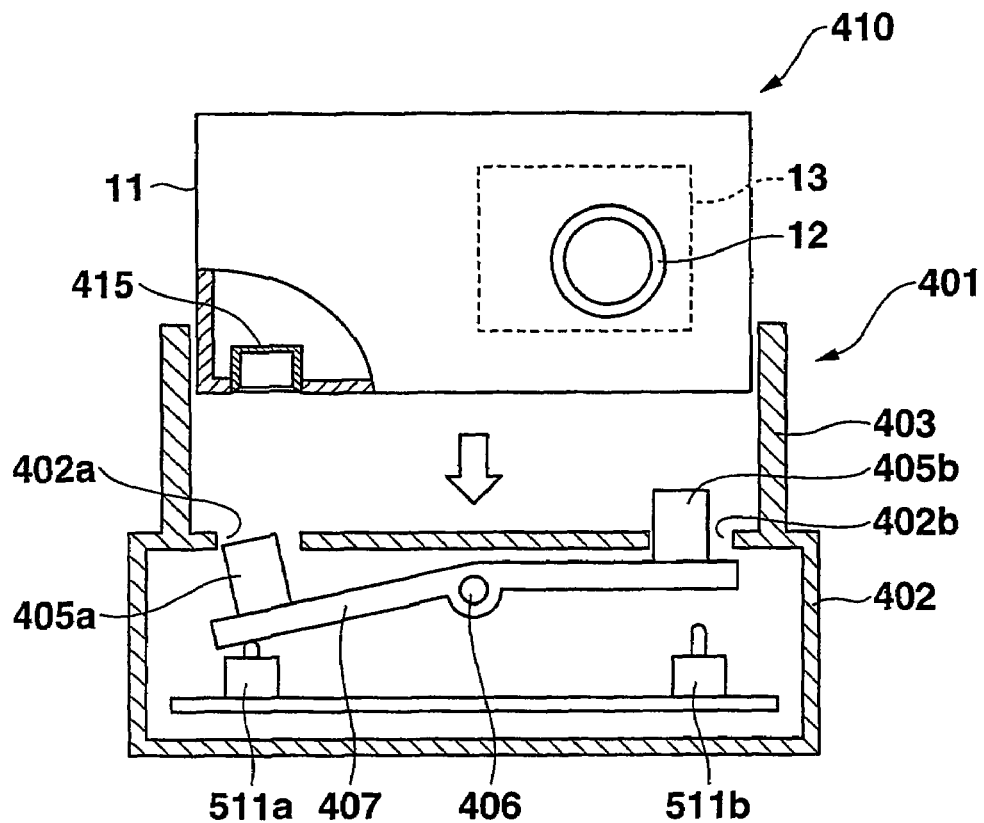
FIG. 14A is a cross sectional view illustrating main portions of the cradle and the digital camera before the digital camera is mounted on the cradle in a modification of the fifth embodiment.
Figure 14B:
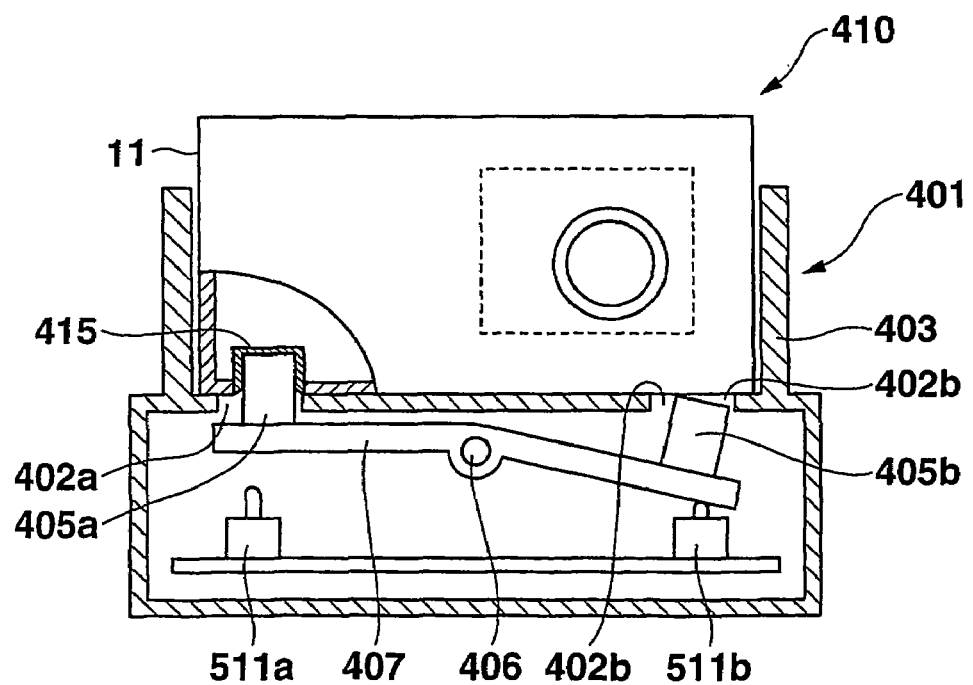
FIG. 14B is a cross sectional view illustrating main portions of the cradle and the digital camera after the digital camera has been mounted on the cradle in the modification of the fifth embodiment.
Figure 15:
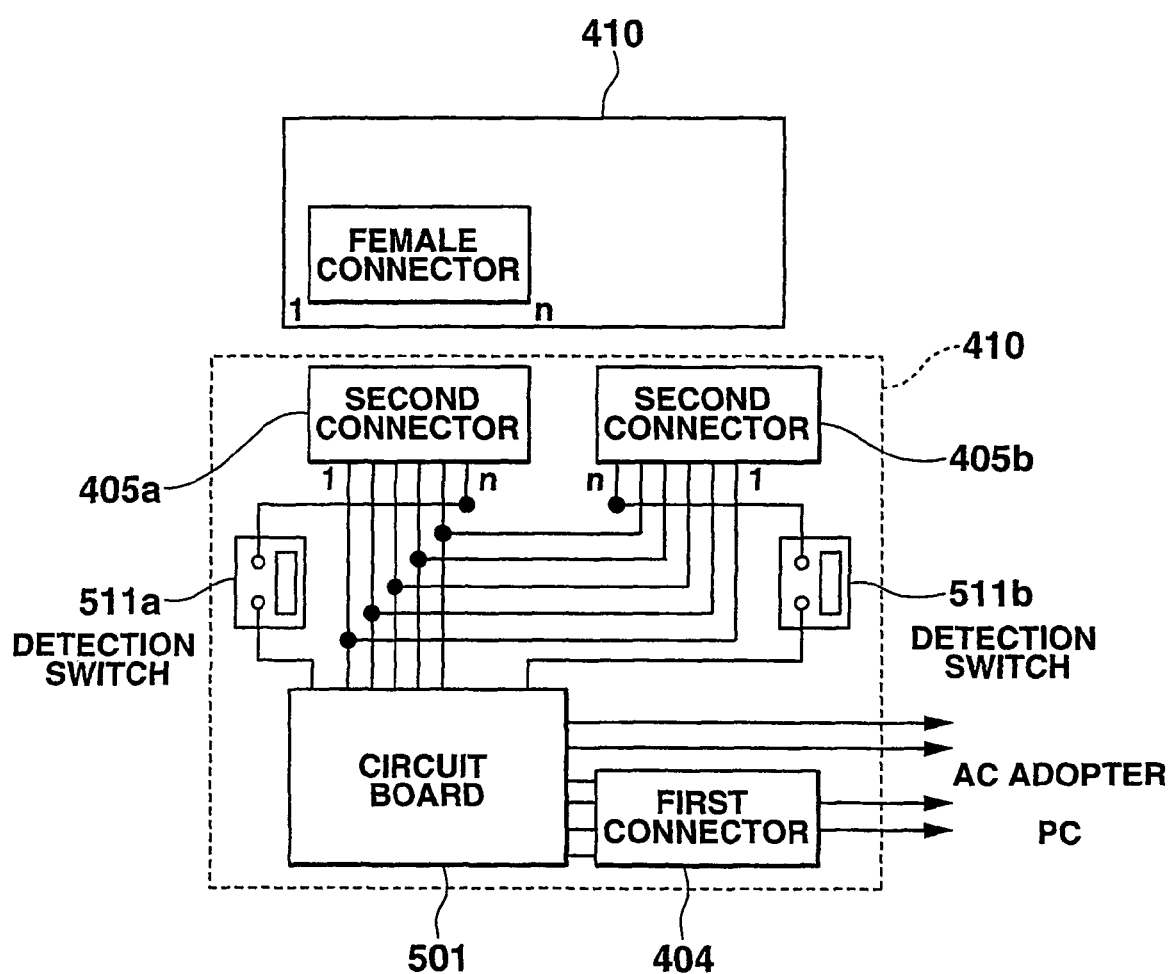
FIG. 15 is a view showing a circuit configuration of a cradle in the modification of the fifth embodiment.

As shown in FIG. 14A and FIG. 14B, there are provided two detection switches (normal open micro-switches) 511a, 511b beneath both ends of the movable member 407 within the base housing 402 of the cradle 401. The detection switches 511a, 511b are normal open micro-switches for detecting which the second connectors 405a or 405b is withdrawn into the base housing 402. The detection switches are located at positions respectively, where either of the switches is depressed to make the circuit by either of the ends of the movable member 407 when the same is turned in the clockwise or the counter-clockwise direction. As shown in a circuit diagram of FIG. 15, the detection terminals (n-th terminals) of the second connectors 405a, 405b are connected to the circuit board 501 through the detection switches 511a, 511b, respectively. When the switches 405a, 405b are closed, the power of different voltage levels are applied from the circuit board 501 to the detection terminals.

In the modification, when the digital camera 410 is installed in the cradle 401, it is judged depending on the voltage level applied to the second connector 405a or 405b, which the second connector 405a or 405b the connector 415 of the digital camera 410 is connected to and it is confirmed that the digital camera 410 is installed with the liquid crystal display facing the front or the rear.

In each of the embodiments, the digital camera connected to the personal computer through the cradle has been described, but the present invention may be applied to other mobile electronic devices such as a personal digital assistant, cellular phones, etc. and to a connecting system having the above electronic devices and a cradle electrically connected to the devices. The embodiments including the personal computer as a data processing apparatus have been described, but the present invention may be applied to a system including a connecting mounting electrically connected to the above electronic device and other electronic device which exchanges data with the former electronic device. The present invention may be applied to a connecting system including the digital camera and a color printer. For example, by installing the digital camera on the cradle in a certain direction, it is possible to make the color printer print an image data sent to the color printer or a list of images.

Further modification and variation can be made to the disclosed embodiments without departing from the subject and spirit of the invention as defined in the following claims. Such modification and variations, as included within the scope of these claims, are meant to be considered part of the invention as described.

The invention claimed is:

1. A connecting system having a connecting mounting, an electronic apparatus detachably mountable on the connecting mounting so as to be electrically connected to the connecting mounting, and a data processing apparatus which exchanges data with the electronic apparatus through the connecting mounting, the connecting system comprising:
    a holding unit which is mounted on the connecting mounting, and on which the electronic apparatus is mountable with a part of the electronic apparatus facing various directions;
    a judging unit which is included in the data processing apparatus, and which judges a direction relative to the connecting mounting that the part of the electronic apparatus faces when the electronic apparatus is mounted on the holding unit; and
    a mode setting unit which is included in the data processing apparatus, and which sets the electronic apparatus in an operation mode in accordance with the direction of the part of the electronic apparatus judged by the judging unit,
    wherein, in the operation mode, data is exchanged between the electronic apparatus and the data processing apparatus.

2. The connecting system according to claim 1, wherein the judging unit turns on the electronic apparatus if the electronic apparatus is turned off when the judging unit judges a connection between the electronic apparatus and the holding unit.

3. The connecting system according to claim 1, wherein the electronic apparatus includes a data transfer mode as the operation mode, and
    wherein, when the electronic apparatus is set in the data transfer mode, one of the electronic apparatus and the data processing apparatus transfers data stored in the electronic apparatus to the data processing apparatus.

4. The connecting system according to claim 1, wherein the electronic apparatus includes a camera mode as the operation mode, and
    wherein, when the electronic apparatus is set in the camera mode, one of the electronic apparatus and the data processing apparatus controls an imaging unit in the electronic apparatus to pick up an image and transfer the picked-up image to the data processing apparatus.

5. The connecting system according to claim 1, wherein the electronic apparatus includes a display mode as the operating mode, and
    wherein, when the electronic apparatus is set in the display mode, one of the electronic apparatus and the data processing apparatus displays an image stored in the electronic apparatus on the data processing apparatus.

6. The connecting system according to claim 1, wherein the electronic apparatus includes a self timer mode as the operating mode, and
    wherein, when the electronic apparatus is set in the self timer mode, one of the electronic apparatus and the data processing apparatus controls an imaging unit in the electronic apparatus to pick up an image by a self timer operation and transfer the picked-up image to the data processing apparatus.

7. The connecting system according to claim 1, wherein the electronic apparatus is mountable in various states on the holding unit with the part of the electronic apparatus facing various directions; and
    wherein the judging unit judges the direction relative to the holding unit that the part of the electronic apparatus faces when the electronic apparatus is mounted on the holding unit.

8. The connecting system according to claim 1, wherein the holding unit is configured to mount the electronic apparatus while the part of the electronic apparatus is directed to various directions with respect to the connecting mounting.

9. The connecting system according to claim 8, wherein the holding unit is fixed to the connecting mounting and is configured to mount the electronic apparatus in one of plural positional relationships; and
    wherein the judging unit judges the one of the plural positional relationships.

10. The connecting system according to claim 8, wherein the holding unit is rotatably connected to the connecting mounting; and
    wherein the judging unit judges a rotation angle of the holding unit.

11. The connecting system according to claim 10, wherein the judging unit is configured to judge at least three rotation angles of the holding unit.

12. The connecting system according to claim 8, wherein the electronic apparatus comprises an electronic apparatus imaging unit and an electronic apparatus main body;
   wherein the electronic apparatus imaging unit is rotatably connected to the electronic apparatus main body; and
   wherein the judging unit judges a rotational relationship between the electronic apparatus imaging unit and the electronic apparatus main body.

13. The connecting system according to claim 12, wherein the judging unit is configured to judge at least three rotational relationships between the electronic apparatus imaging unit and the electronic apparatus main body.

14. A data processing apparatus for exchanging data with an electronic apparatus through a connecting mounting when the electronic apparatus is electrically connected to the connecting mounting, the data processing apparatus comprising:
   a judging unit which judges a direction relative to the connecting mounting that a part of the electronic apparatus faces when the electronic apparatus is mounted on the connecting mounting; and
   a mode setting unit which sets the data processing apparatus in an operation mode in accordance with the direction judged by the judging unit,
   wherein, in the operation mode, data is exchanged between the data processing apparatus and the electronic apparatus,
   wherein the electronic apparatus comprises an image pickup apparatus, and
   wherein the operation mode set in accordance with the direction judged by the judging unit comprises plural operation modes including an image-data transferring mode, in which image data stored in a memory of the image pickup apparatus is transferred to the data processing apparatus.

15. A data processing apparatus for exchanging data with an electronic apparatus through a connecting mounting when the electronic apparatus is electrically connected to the connecting mounting, the data processing apparatus comprising:
   a judging unit which judges a direction relative to the connecting mounting that a part of the electronic apparatus faces when the electronic apparatus is mounted on the connecting mounting; and
   a mode setting unit which sets the data processing apparatus in an operation mode in accordance with the direction judged by the judging unit,
   wherein, in the operation mode, data is exchanged between the data processing apparatus and the electronic apparatus,
   wherein the electronic apparatus comprises an image pickup apparatus, and
   wherein the operation mode set in accordance with the direction judged by the judging unit comprises plural operation modes including a photographing mode, in which image data is generated with an image pickup element of the image pickup apparatus and is transferred to the data processing apparatus.

16. A data processing apparatus for exchanging data with an electronic apparatus through a connecting mounting when the electronic apparatus is electrically connected to the connecting mounting, the data processing apparatus comprising:
   a judging unit which judges a direction relative to the connecting mounting that a part of the electronic apparatus faces when the electronic apparatus is mounted on the connecting mounting;
   a mode setting unit which sets the data processing apparatus in an operation mode in accordance with the direction judged by the judging unit, wherein, in the operation mode, data is exchanged between the data processing apparatus and the electronic apparatus; and
   an operation requesting unit which requests the electronic apparatus to perform an operation corresponding to a data transferring mode, which is set in the data processing apparatus based on the direction judged by the judging unit.

17. An operation mode setting method for a data processing apparatus which exchanges data with an electronic apparatus through a connecting mounting when the electronic apparatus is detachably mounted on the connecting mounting and is electrically connected to the connecting mounting, the operation mode setting method comprising:
   judging a direction relative to the connecting mounting that a part of the electronic apparatus faces when the electronic apparatus is mounted on the connecting mounting; and
   setting the data processing apparatus in an operation mode in accordance with the judged direction,
   wherein, in the operation mode, data is exchanged between the data processing apparatus and the electronic apparatus, and
   wherein a holding unit mounted on the connecting mounting is configured to mount the electronic apparatus while the part of the electronic apparatus is directed to various directions with respect to the connecting mounting.

18. The operation mode setting method according to claim 17, further comprising turning on the electronic apparatus if the electronic apparatus is turned off when a connection between the electronic apparatus and the holding unit is judged.

19. An operation mode setting method for a data processing apparatus which exchanges data with an electronic apparatus through a connecting mounting when the electronic apparatus is detachably mounted on the connecting mounting and is electrically connected to the connecting mounting, the operation mode setting method comprising:
   judging a direction relative to the connecting mounting that a part of the electronic apparatus faces when the electronic apparatus is mounted on the connecting mounting; and
   setting the data processing apparatus in an operation mode in accordance with the judged direction,
   wherein, in the operation mode, data is exchanged between the data processing apparatus and the electronic apparatus,
   wherein the electronic apparatus includes a data transfer mode as the operation mode, and
   wherein, when the electronic apparatus is set in the data transfer mode, one of the electronic apparatus and the data processing apparatus transfers data stored in the electronic apparatus to the data processing apparatus.

20. An operation mode setting method for a data processing apparatus which exchanges data with an electronic apparatus through a connecting mounting when the electronic apparatus is detachably mounted on the connecting mounting and is electrically connected to the connecting mounting, the operation mode setting method comprising:
   judging a direction relative to the connecting mounting that a part of the electronic apparatus faces when the electronic apparatus is mounted on the connecting mounting; and
   setting the data processing apparatus in an operation mode in accordance with the judged direction,
   wherein, in the operation mode, data is exchanged between the data processing apparatus and the electronic apparatus, wherein the electronic apparatus includes a camera mode as the operation mode, and wherein, when the electronic apparatus is set in the camera mode, one of the electronic apparatus and the data processing apparatus controls an imaging unit in the electronic apparatus to pick up an image and transfer the picked-up image to the data processing apparatus.

21. An operation mode setting method for a data processing apparatus which exchanges data with an electronic apparatus through a connecting mounting when the electronic apparatus is detachably mounted on the connecting mounting and is electrically connected to the connecting mounting, the operation mode setting method comprising:

judging a direction relative to the connecting mounting that a part of the electronic apparatus faces when the electronic apparatus is mounted on the connecting mounting; and setting the data processing apparatus in an operation mode in accordance with the judged direction, wherein, in the operation mode, data is exchanged between the data processing apparatus and the electronic apparatus, wherein the electronic apparatus includes a display mode as the operation mode, and wherein, when the electronic apparatus is set in the display mode, one of the electronic apparatus and the data processing apparatus displays an image stored in the electronic apparatus on the data processing apparatus.

22. An operation mode setting method for a data processing apparatus which exchanges data with an electronic apparatus through a connecting mounting when the electronic apparatus is detachably mounted on the connecting mounting and is electrically connected to the connecting mounting, the operation mode setting method comprising:

judging a direction relative to the connecting mounting that a part of the electronic apparatus faces when the electronic apparatus is mounted on the connecting mounting; and setting the data processing apparatus in an operation mode in accordance with the judged direction, wherein, in the operation mode, data is exchanged between the data processing apparatus and the electronic apparatus, wherein the electronic apparatus includes a self timer mode as the operation mode, and wherein, when the electronic apparatus is set in the self timer mode, one of the electronic apparatus and the data processing apparatus controls an imaging unit in the electronic apparatus to pick up an image by a self timer operation and transfer the picked-up image to the data processing apparatus.

* * * * *